United States Patent
Sato

(10) Patent No.: US 9,517,653 B2
(45) Date of Patent: Dec. 13, 2016

(54) INFORMATION PROCESSING FOR EXECUTING PRE-PRESS AND PRESS PROCESSES

(71) Applicant: CANON KABUSHIKI KAISHA, Tokyo (JP)

(72) Inventor: Junko Sato, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 99 days.

(21) Appl. No.: 13/975,088

(22) Filed: Aug. 23, 2013

(65) Prior Publication Data

US 2014/0064882 A1   Mar. 6, 2014

(30) Foreign Application Priority Data

Sep. 5, 2012  (JP) ................ 2012-195498

(51) Int. Cl.
*B42C 11/04*   (2006.01)
*G06F 3/12*    (2006.01)

(52) U.S. Cl.
CPC ............. *B42C 11/04* (2013.01); *G06F 3/1205* (2013.01); *G06F 3/125* (2013.01); *G06F 3/1253* (2013.01); *G06F 3/1282* (2013.01); *G06F 3/1264* (2013.01)

(58) Field of Classification Search
CPC ..... G06K 15/00; G06K 15/1868; B42C 11/04; G06F 3/1205; G06F 3/125; G06F 3/1253; G06G 3/1282
USPC ............. 270/58.09; 399/407, 408, 409, 410; 358/1.18
See application file for complete search history.

(56) References Cited

U.S. PATENT DOCUMENTS

| | | | |
|---|---|---|---|
| 6,883,981 B2 | 4/2005 | Kizaki et al. | |
| 7,177,045 B2 * | 2/2007 | Goel et al. | 358/1.18 |
| 7,333,246 B1 * | 2/2008 | Kowalski et al. | 358/452 |
| 7,426,057 B2 | 9/2008 | Mori et al. | |
| 7,456,984 B2 | 11/2008 | Nishikawa et al. | |
| 7,495,789 B2 | 2/2009 | Sato | |
| 7,688,459 B2 | 3/2010 | Mori et al. | |
| 7,927,030 B2 | 4/2011 | Kizaki et al. | |
| 8,189,229 B2 * | 5/2012 | Mori | 358/1.18 |
| 8,215,852 B2 | 7/2012 | Kizaki et al. | |
| 8,237,978 B2 * | 8/2012 | Bottcher et al. | 358/1.18 |
| 8,248,654 B2 | 8/2012 | Sato | |

(Continued)

FOREIGN PATENT DOCUMENTS

| | | |
|---|---|---|
| JP | 2007-299286 A | 11/2007 |
| JP | 2008-155632 A | 7/2008 |

(Continued)

OTHER PUBLICATIONS

Japanese Office Action dated Jul. 22, 2016 in Japanese Patent Application No. 2012-195498.

*Primary Examiner* — Patrick Mackey
(74) *Attorney, Agent, or Firm* — Fitzpatrick, Cella, Harper & Scinto

(57) ABSTRACT

When two or more post-processing devices are designated for a print job, two or more attribute values (finished size, imposition method, finishing, etc.) of each print attributes which can be set for the print job are allowed to set. When two or more finished size attribute values are set, finished pages having a size smaller than a given finished size and register marks are sequentially laid out in a finished page having the given finished size in a nested manner.

6 Claims, 38 Drawing Sheets

(56) References Cited

U.S. PATENT DOCUMENTS

| | | | |
|---|---|---|---|
| 8,456,690 B2 | 6/2013 | Morales et al. | |
| 8,582,147 B2* | 11/2013 | Sato | 358/1.15 |
| 8,605,323 B2* | 12/2013 | Gaash et al. | 358/1.18 |
| 2004/0174563 A1* | 9/2004 | Cassidy et al. | 358/1.18 |
| 2007/0229902 A1* | 10/2007 | Sato | 358/1.18 |
| 2007/0229903 A1* | 10/2007 | Sato | 358/1.18 |
| 2008/0123138 A1* | 5/2008 | Banerjee et al. | 358/1.18 |
| 2008/0237963 A1* | 10/2008 | Reichhart | 270/52.01 |
| 2008/0239381 A1 | 10/2008 | Oshima | |
| 2010/0238490 A1 | 9/2010 | Sato | |
| 2012/0050813 A1* | 3/2012 | Gaash et al. | 358/1.18 |
| 2013/0201520 A1 | 8/2013 | Sato | |

FOREIGN PATENT DOCUMENTS

| | | |
|---|---|---|
| JP | 2008-243067 A | 10/2008 |
| JP | 2010-26578 A | 2/2010 |

* cited by examiner

F I G. 3A

| NO. | ATTRIBUTE INFORMATION | | REMARKS |
|---|---|---|---|
| 1 | PRINT METHOD | SINGLE-SIDED/ DOUBLE-SIDED/ BOOKBINDING PRINT | |
| 2 | PAPER SIZE | ORIGINAL DOCUMENT SIZE / FIXED SIZE | •Z-FOLD DESIGNATION FOR "A4 + A3", "B4 + B3", AND "LETTER + LEDGER (11 ×17)" DESIGNATIONS<br>•ORIGINAL DOCUMENT SIZE OF 1ST CHAPTER/ PAGE IS AUTOMATICALLY SELECTED WHEN BOOKBINDING PRINT OR N-up PRINT IS DESIGNATED |
| 3 | PAPER ORIENTATION | PORTRAIT/ LANDSCAPE | •SELECTABLE ONLY FOR FIXED SIZE |
| 4 | FINISHED SIZE | FIXED SIZE/USER DESIGNATED SIZE | |
| 5 | IMPOSITION METHOD | LEAF/QUARTO/ SADDLE STITCHING/ CASING-IN/NESTING | |
| 6 | REGISTER MARK/ OFFCUT REGION (OFFCUT) | ON/OFF | |
| 7 | BINDING MARGIN/ BINDING DIRECTION | | •DESIGNATION OF SHIFT/ ENLARGEMENT/ REDUCTION ALLOWED |
| 8 | N-up PRINT DESIGNATION | NUMBER OF PAGES/ LAYOUT ORDER/ BORDER LINE/ LAYOUT POSITION, ETC. | •NINE PATTERNS OF LAYOUT POSITIONS<br>•DESIGNATION OF EQUAL-MAGNIFICATION PRINT ALLOWED |
| 9 | ENLARGEMENT/ REDUCTION | ON/OFF | ON IS AUTOMATICALLY DESIGNATED WHEN FIXED SIZE IS SELECTED AS PAPER SIZE OR N-up PRINT IS SELECTED |
| 10 | WATERMARK | | •INDIVIDUAL DESIGNATIONS IN LOGICAL PAGE UNIT AND IN PHYSICAL PAGE UNIT ALLOWED<br>•FOR ALL CHAPTERS/ALL PAGES |
| 11 | HEADER/FOOTER | | •INDIVIDUAL DESIGNATIONS IN LOGICAL PAGE UNIT AND IN PHYSICAL PAGE UNIT ALLOWED<br>•FOR ALL CHAPTERS/ALL PAGES |

FIG. 3B

| 12 | DISCHARGE METHOD | STAPLE/ PUNCH HOLE | •DESIGNATION OF STAPLE/ PUNCH ALLOWED ONLY FOR SINGLE-SIDED/DOUBLE-SIDED PRINT<br>•1/2 POSITIONS FOR STAPLE |
|---|---|---|---|
| 13 | BOOKBINDING DETAIL | PAGE-SPREAD DIRECTION/ SADDLE STITCHING/ ENLARGEMENT/ REDUCTION DESIGNATION/ BINDING MARGIN/ SEPARATE BINDING DESIGNATION, ETC. | •ONLY AT BOOKBINDING PRINT |
| 14 | FRONT/ BACK COVER | | •PRINT DESIGNATION FOR FRONT COVER 1/2 AND BACK COVER 1/2<br>•DESIGNATION OF PAPER FEED PORT (INCLUDING INSERTER) |
| 15 | INDEX SHEET | | •CHARACTER STRING PRINT ON INDEX PART AND ANNOTATION ON INDEX SHEET CAN BE SET<br>•DESIGNATION OF BOOKBINDING PRINT NOT ALLOWED |
| 16 | SLIP SHEET | | •DESIGNATION OF PAPER FEED PORT (INCLUDING INSERTER)<br>•ORIGINAL DOCUMENT DATA IS PRINTABLE ON INSERT SHEET<br>•DESIGNATION OF BOOKBINDING PRINT NOT ALLOWED |
| 17 | CHAPTER DIVISION | "NONE"/ "PAGE CHANGE"/ "SHEET CHANGE" | •"SHEET CHANGE" IS FIXED UPON DESIGNATION OF INDEX SHEET AND SLIP SHEET<br>•"SHEET CHANGE" FOR SINGLE-SIDED PRINT |
| 18 | FINISHING | SADDLE STITCHING/ CASE BINDING/ TRIMMING | |
| 19 | GLUED-ON COVER SIZE | FIXED SIZE/USER DESIGNATED SIZE | |
| 20 | FINISHING ENLARGEMENT/ REDUCTION | ON/OFF | |
| 21 | OFFCUT REGION ENLARGEMENT/ REDUCTION | ON/OFF | |

FIG. 12B

| GENERAL DOCUMENT SETTING | ☒ |

| PAPER SETTING | PAGE SETTING | FINISHING | EDIT | PAPER SOURCE | PRINT QUALITY |

PRINT METHOD(Y): ⦿ SINGLE-SIDED PRINT
○ DOUBLE-SIDED PRINT

BOOKBINDING METHOD(K): [NONE ▼]

BINDING DIRECTION(B): [LEFT BINDING ▼]

BINDING MARGIN(G): [0] mm(0~50)

ORIGINAL DOCUMENT ADJUSTMENT(J):
⦿ REDUCE TO FIT TO PRINT REGION SET BY BINDING MARGIN
○ MOVE TO FIT TO BINDING MARGIN

CHAPTER DIVISION(X): [NONE ▼]

FINISHER
- STAPLE DESIGNATION(S): [NONE ▼]
- STAPLE POSITION(L): [UPPER LEFT (ONE POSITION) ▼]
- PUNCH HOLE(N): [NONE ▼]
- FOLD(F): [NONE ▼]
  [FOLD DETAIL(D)...]

☑ AUTOMATICALLY TRIM TO FIT TO FINISHED SIZE(S)
☐ SET CREASE(C)   [CREASE POSITION SETTING]

[REVERT TO LATEST STORED STATE(V)]

[OK]  [CANCEL]  [APPLY(A)]  [HELP(H)]

FIG. 14

| JDF OUTPUT | | ☒ |
|---|---|---|
| JOB NAME(J): | CASE BINDING 1 | |
| USER NAME(R): | OPERATOR 1 | |

PRINTER NAME(N): 7000VP ▼   PROPERTY(P)...
☑ POST-PROCESS IS EXECUTED USING NEAR-LINE FINISHER
NEAR-LINE FINISHER NAME: CASE BINDER ▼   PROPERTY(P)...

UNAVAILABLE FUNCTION LIST:

OUTPUT METHOD(D): 📦 PRINT ▼
NUMBER OF COPIES(C): 1   COPY COUNT PRINT(M)...
☑ PRINT IN COPY UNIT(O)
☐ SHIFT(F)   UNIT(U): 1   COPIES (1~9999)
DISCHARGE SETTING: AUTO/PANEL PRIORITY   DISCHARGE SETTING(I)...

☐ EXECUTE VARIABLE PRINT(V)   DESIGNATE RECORD(Y)...
PRINT RANGE DESIGNATION METHOD(T): DOCUMENT (ALL) ▼

SAVE AS JDF/MJD(S)...   OK   CANCEL   HELP(H)

Labels: 1401, 1402, 1403, 1404, 1405, 1408

F I G. 18B

```
┌─────────────────────────────────────────────────────────────────┐
│ GENERAL DOCUMENT SETTING <2>                                 [X]│
├─────────────────────────────────────────────────────────────────┤
│ ┌──────┐┌──────┐┌─────────┐┌────┐┌──────┐┌──────┐               │
│ │PAPER ││PAGE  ││FINISHING││EDIT││PAPER ││PRINT │               │
│ │SETTING││SETTING│         │    ││SOURCE││QUALITY│              │
│ └──────┘└──────┘└─────────┘└────┘└──────┘└──────┘               │
│                                                                 │
│ PRINT METHOD(Y):       [icon]  ○ SINGLE-SIDED PRINT             │
│                                ◉ DOUBLE-SIDED PRINT             │
│                                                                 │
│ BOOKBINDING METHOD(K): [ CASE BINDING                       ▼]  │
│ ─────────────────────────────────────────────────────────────── │
│ OPENING DIRECTION(Q):  [ [icon] LEFT OPENING                ▼]  │
│                                                                 │
│                        □ DESIGNATE                              │
│   [book icon]            BOOKBINDING MARGIN(G): [ 0 ▲▼] mm(0~50)│
│                        □ MOVE ORIGINAL DOCUMENT TO BINDING      │
│                          POSITION(B)                            │
│                        ◉ REDUCE TO FIT TO PRINT REGION SET BY   │
│ ORIGINAL DOCUMENT        BOOKBINDING MARGIN                     │
│ ADJUSTMENT(J):         ○ MOVE TO FIT TO BOOKBINDING MARGIN      │
│ ─────────────────────────────────────────────────────────────── │
│ GLUED-ON COVER                                                  │
│ PAPER SIZE(P):         [ A3                                 ▼]  │
│ GLUED-ON COVER         [ COVER 1/COVER 4 (TWO ORIGINAL DOCUMENTS),│
│ DESIGNATION(C):          COVER 2/COVER 3 (TWO ORIGINAL DOCUMENTS)▼]│
│                                                                 │
│                        *[COVER/SLIP SHEET SETTING] WHEN INSERTER│
│  [A][B]..[Y][Z]         IS DESIGNATED AS [PAPER SOURCE] OF COVER│
│        ↓                ON DIALOG BOX, [GLUED-ON COVER DESIGNATION]│
│  [Z][A] [B][Y]          AND SPINE SETTING ARE INVALID.          │
│                                                                 │
│                                         [ CREATE SPINE(S)... ]  │
│ ─────────────────────────────────────────────────────────────── │
│ CHAPTER DIVISION(X):   [ NONE                               ▼]  │
│ ─────────────────────────────────────────────────────────────── │
│ FINISHER(E):           [ GLUE ON AND TRIM COVER ▼] [SHEET TRIMMING(T)...]│
│                                                                 │
│                                [ REVERT TO LATEST STORED STATE(V) ]│
│                                                                 │
│          [   OK   ] [ CANCEL ] [ APPLY(A) ] [ HELP(H) ]         │
└─────────────────────────────────────────────────────────────────┘
```

FIG. 19

| JDF OUTPUT | ☒ |
|---|---|

JOB NAME(J): CASE BINDING 1
USER NAME(R): OPERATOR 1

PRINTER NAME(N): 7000VP  [PROPERTY(P)...]
☑ POST-PROCESS IS EXECUTED USING NEAR-LINE FINISHER — 1404 — 1901

FIRST FINISHER NAME: CASE BINDER  [PROPERTY(P)...]
SECOND FINISHER NAME: CUTTING MACHINE 1  [PROPERTY(P)...]
THIRD FINISHER NAME: CUTTING MACHINE 2  [PROPERTY(P)...]
[ADD FINISHER] — 1904    1903  1902

UNAVAILABLE FUNCTION LIST:

OUTPUT METHOD(D): 🖶 PRINT
NUMBER OF COPIES(C): 1    [COPY COUNT PRINT(M)...]

☑ PRINT IN COPY UNIT(O)
☐ SHIFT(F)  UNIT(U): 1  COPIES (1~9999)

DISCHARGE SETTING: AUTO/PANEL PRIORITY    [DISCHARGE SETTING(I)...]

☐ EXECUTE VARIABLE PRINT(V)    [DESIGNATE RECORD(Y)...]

PRINT RANGE DESIGNATION METHOD(T): DOCUMENT (ALL)

[SAVE AS JDF/MJD(S)...]  [OK]  [CANCEL]  [HELP(H)]

FIG. 20A

NEST SETTING IS DISABLED SINCE PAGE TO BE NESTED IS NOT AVAILABLE

EXECUTE POST-PROCESSES IN FOLLOWING ORDER AFTER COMPLETION OF PRINTING OF PRINTER.

1. SECOND FINISHER - CUTTING MACHINE B
2. THIRD FINISHER - CASE BINDER A
3. FIRST FINISHER - CUTTING MACHINE C

OK

F I G. 24E
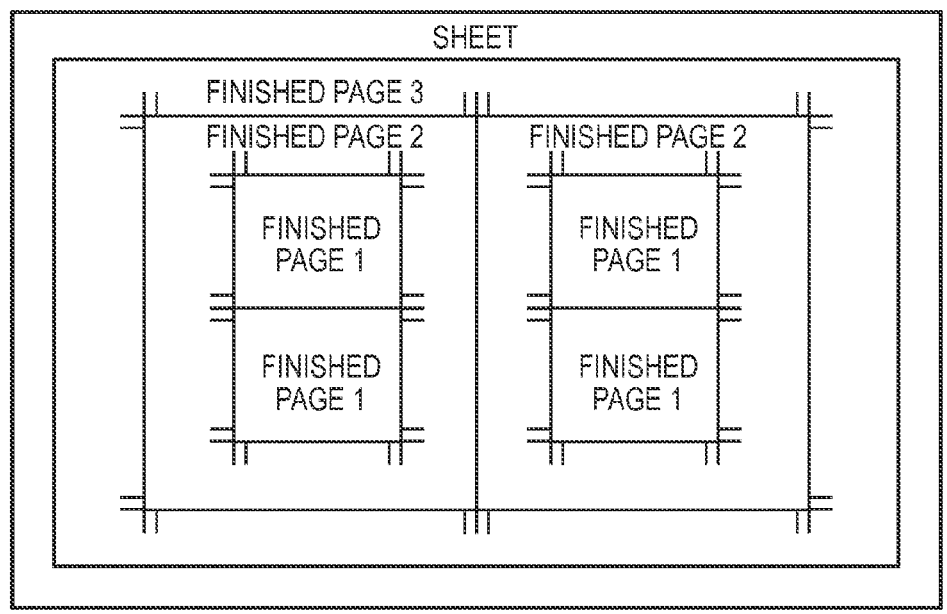
F I G. 24F
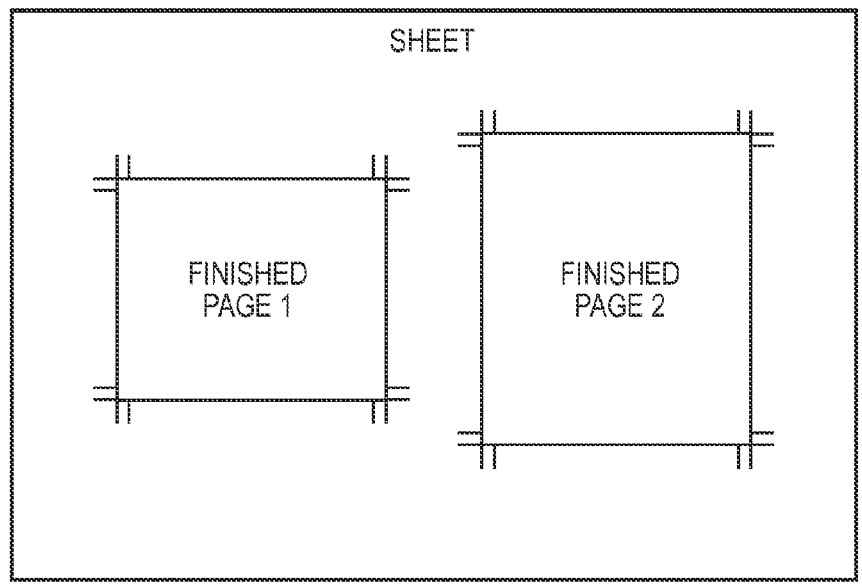

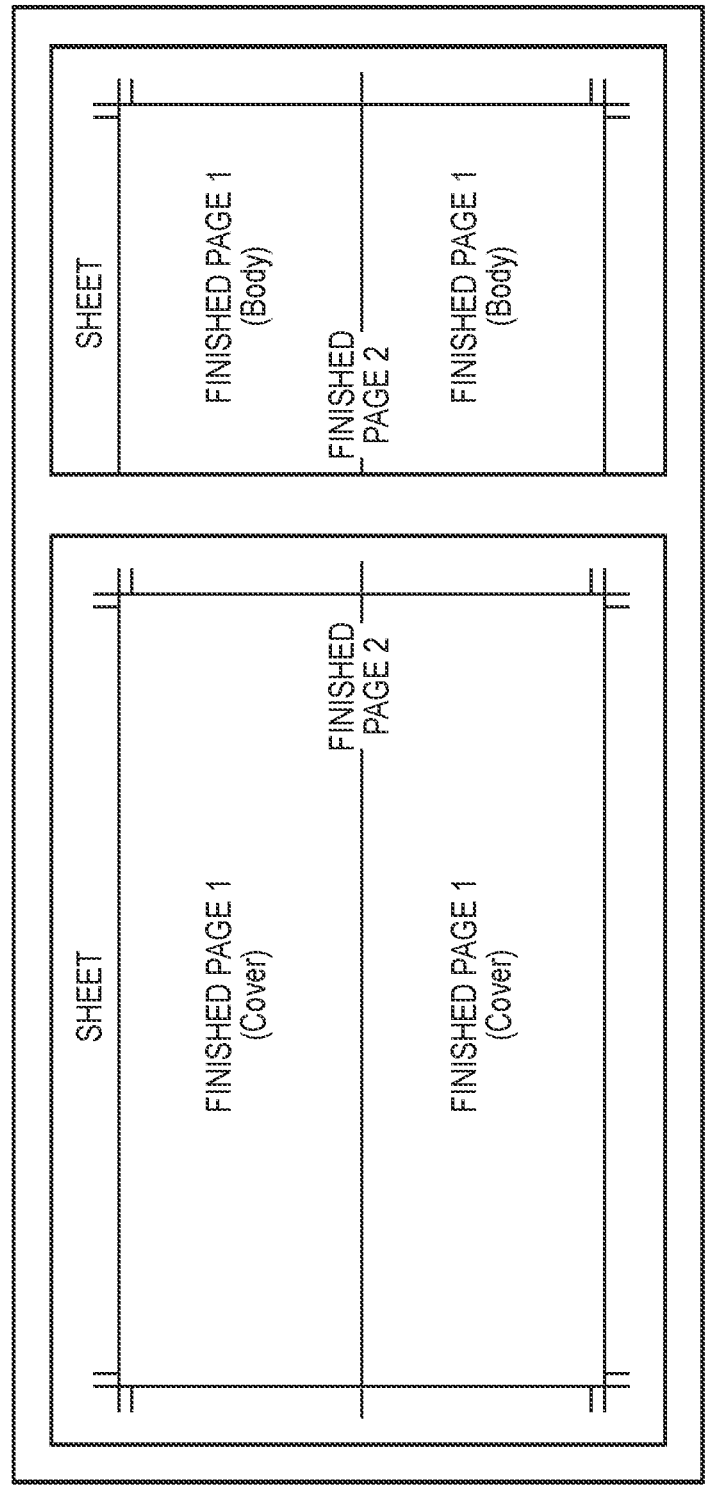

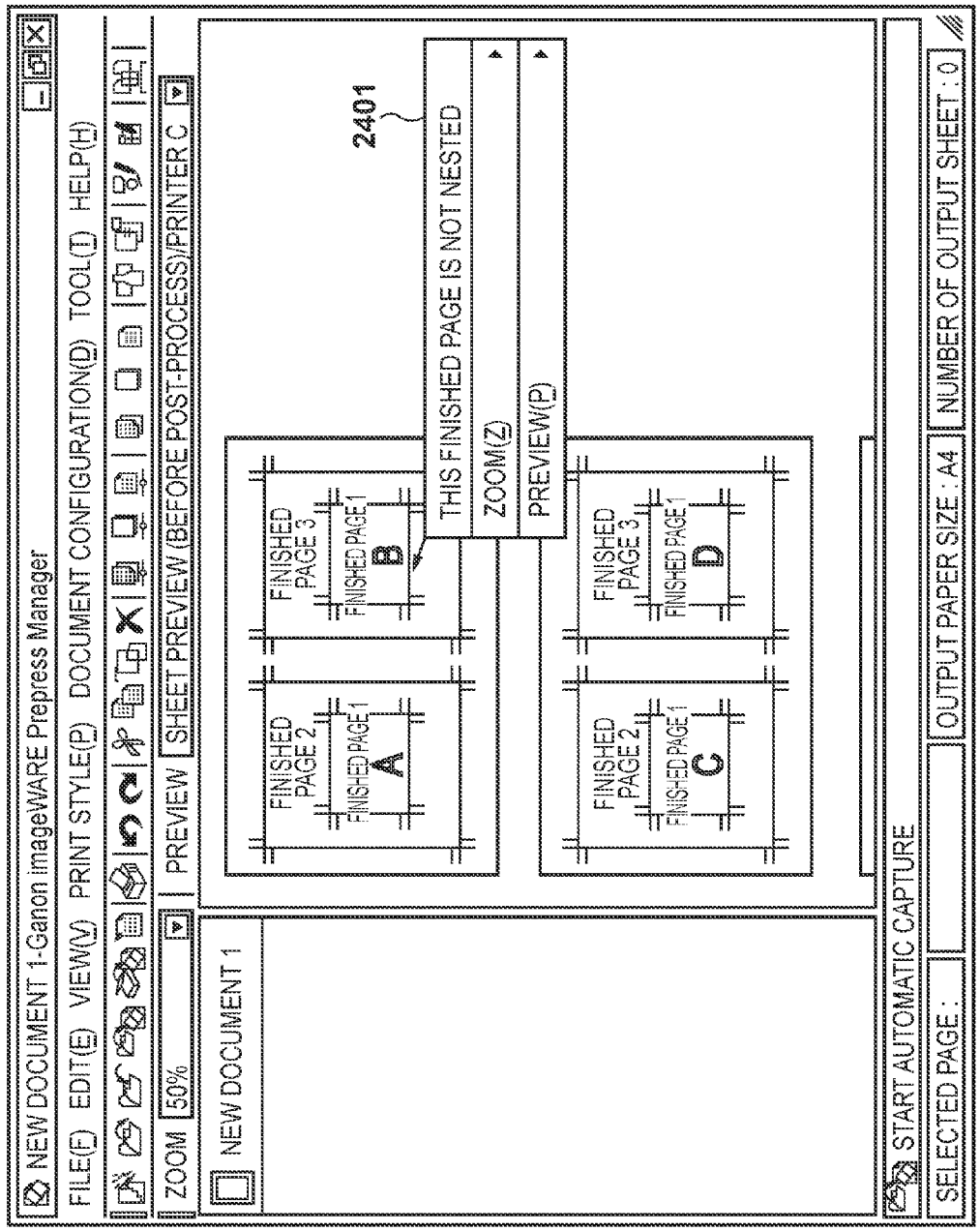

INFORMATION PROCESSING FOR EXECUTING PRE-PRESS AND PRESS PROCESSES

BACKGROUND OF THE INVENTION

Field of the Invention

The present invention relates to an information processing apparatus, information processing method, and program for executing pre-press and press processes by combining, for example, a printer and a plurality of near line finishers.

Description of the Related Art

In recent years, along with speeding up and image quality enhancement of electrophotographic and inkjet printers, a business category called "Print On Demand" is coming into the market against the conventional print industry. The Print On Demand will be abbreviated as POD hereinafter. In the POD, post-processes such as cutting, creasing, perforating, stapling, punching, saddle stitching, and case binding are often executed. Note that Japanese Patent Laid-Open No. 2010-26578 describes that the post processes are executed using a plurality of post-processing devices (finishers).

In case of a plurality of post-processes to be executed, layout processes are required in correspondence with the plurality of post-processes. However, Japanese Patent Laid-Open No. 2010-26578 does not describe any method of realizing the layout processes in correspondence with the plurality of post-processes by simple operations.

SUMMARY OF THE INVENTION

The present invention has been made in consideration of the aforementioned related art, and provides an information processing apparatus, information processing method, and program, which reduce the work load on an operator and improve the work precision with respect to a plurality of post-processes.

According to one aspect of the present invention, an information processing apparatus comprises: a designation unit configured to designate a plurality of post-processing devices used to execute post-processes of a printed material obtained after execution of one print job; a setting unit configured to set setting values of print attributes for a print job in association with the designated post-processing devices; and an imposition unit configured to execute, when the setting unit sets a plurality of finished sizes, nesting imposition which nests a page of a first finished size in a page of a second finished size larger than the first finished size.

According to the present invention, an effect of reducing the operation load on the user even upon execution of a plurality of post-processes can be provided. Also, the work precision can be improved.

Further features of the present invention will become apparent from the following description of exemplary embodiments with reference to the attached drawings.

BRIEF DESCRIPTION OF THE DRAWINGS

FIGS. 3A and 3B show tables showing an example of book attributes;

FIG. 12B is a view showing a user interface window used to set book attributes;

FIG. 14 is a view showing an example of a user interface window used to execute a JDF output process;

FIG. 18B is a view showing a user interface window used to set book attributes;

FIG. 19 is a view showing a user interface window required to execute JDF output processing;

FIGS. 20A and 20B are views showing examples of message dialogs displayed by a bookbinding application;

FIG. 24E is a view showing an example of the result of the layout data generation processing;

FIG. 24F is a view showing an example of the result of the layout data generation processing;

FIG. 24I is a view showing an example of the result of the layout data generation processing;

FIG. 24K is a view showing an example of the result of the layout data generation processing;

DESCRIPTION OF THE EMBODIMENTS

The best mode of carrying out the present invention will be described hereinafter with reference to the drawings. An overview of a document processing system as a preferred embodiment of an information processing system of the present invention will be described below with reference to FIGS. 1 to 12.

<Arrangement of Document Processing System>

Figure 1:
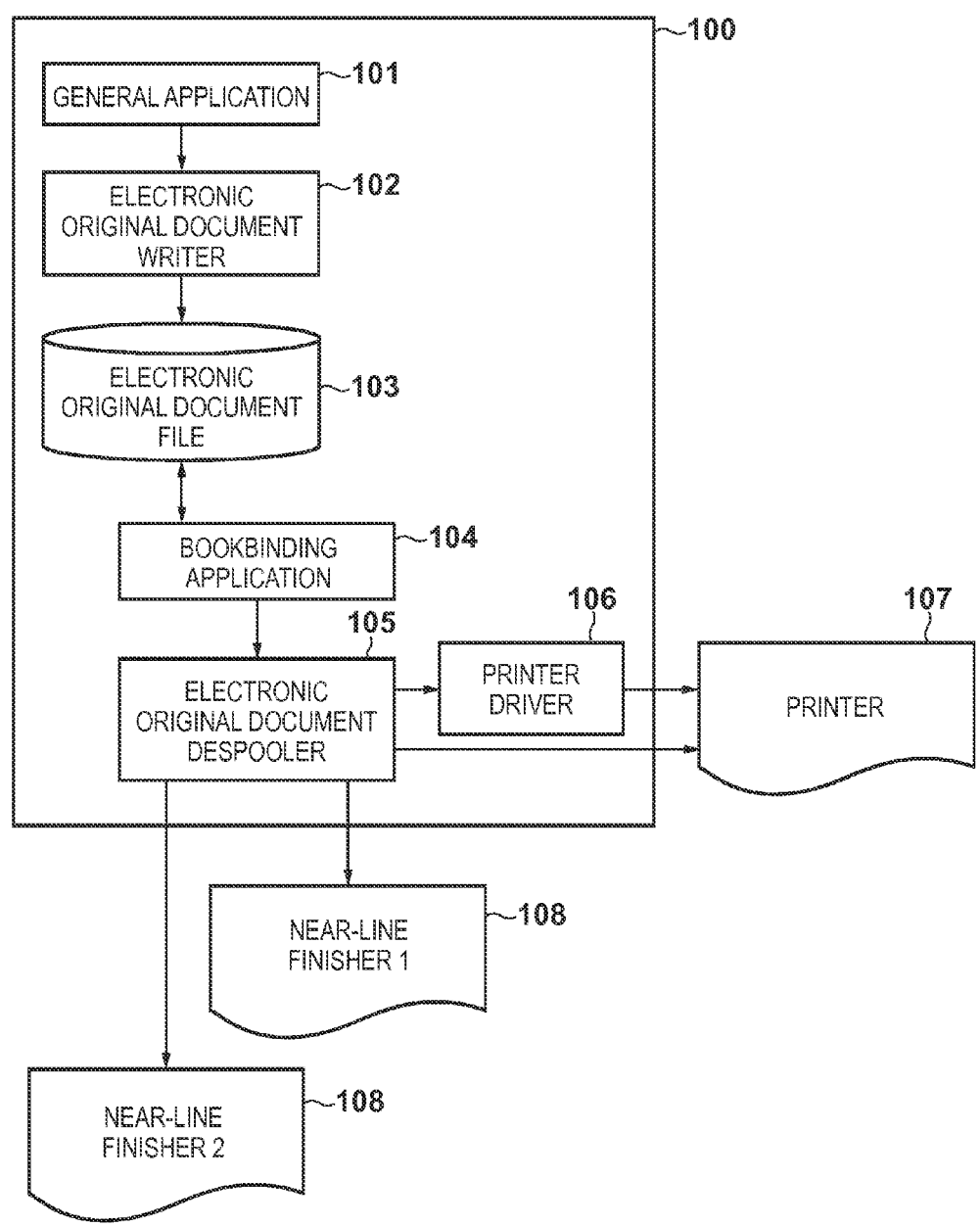
FIG. 1 is a block diagram for explaining the arrangement of a document processing system.

FIG. 1 is a block diagram showing the software arrangement suited to the information processing system (or print system) according to an embodiment of the present invention. This document processing system is implemented by a computer 100 as a preferred embodiment of an information processing apparatus according to this embodiment. A general application 101 includes application programs which provide a wordprocessing function, spreadsheet function, text edit function, and the like. These application programs use a predetermined interface provided by an OS (Operating System) upon printing application data such as generated document data or image data. Then, the application data is converted into print data by a printer driver. An electronic original document writer 102 is a software module prepared by modifying a printer driver. However, the electronic original document writer 102 does not target at a specific device, and generates an electronic original document file 103 in a format which can be processed by a bookbinding application 104 and printer driver 106 (to be described later). A format (to be referred to as "electronic original document format" hereinafter) after conversion by this electronic original document writer 102 is not particularly limited as long as it can express an original document for each page to have a detailed form. As a practical standard format, a PDF format by Adobe Systems, an SGML format, and the like may be used. When the application 101 uses the electronic original document writer 102, it designates the electronic original document writer 102 as a printer driver used in an output process, and then executes a print process. However, an electronic original document file generated by the electronic original document writer 102 does not have a complete format as an electronic original document file. For this reason, the bookbinding application 104 designates the electronic original document writer 102 as a printer driver, and conversion of application data into an electronic original document file is executed under the management of the bookbinding application 104. The bookbinding application 104 completes an electronic original document file generated by the electronic original document writer 102 as that including a format (to be described later). In the following description, in order to clearly identify this point, a file generated by the electronic original document writer 102 will be referred to as an "electronic original document file", and an electronic original document file given with a structure by the bookbinding application 104 will be referred to as a "book file". When these files need not be particularly distinguished from each other, all of a document file, electronic original document file, and book file generated by the applications will be referred to as document files (or document data).

The electronic original document writer 102 is designated as a printer driver, and a print mode is designated via the general application 101. As a result, application data is converted into the electronic original document format for each page (to be referred to as a "logical page" or "original document page" hereinafter), and is stored as the electronic original document file 103 in a memory such as a hard disk. Note that the hard disk may be a local drive included in the computer which implements the document processing system according to this embodiment, or may be a drive provided on a network when the system is connected to the network.

Post-processes for printed materials are executed by post-processing devices called finishers (a creaser, cutting machine, and the like). The finishers can be classified into three categories. The first category includes an inline finisher to which a printer and a sheet convey path are connected. The second category includes a near-line finisher which is not connected to the printer via the sheet convey path. The third category includes an offline finisher which is not connected to other devices via a network, and is not connected to the printer via the sheet convey path. When the near-line finisher or offline finisher is used, an operator has to carry printed materials as post-process targets to the near-line finisher or offline finisher to be used.

Note that post-processes by the near-line finisher and offline finisher are often used not only to merely compensate for printer functions but also for the purpose of effective use of output sheets and time savings. For example, as a case in which cutting is made as a post-process, a plurality of finished pages are imposed on a relatively large sheet, are printed using a printer, and are then cut into finished sizes using a near-line finisher. In this manner, a plurality of products can be obtained from a single sheet. Furthermore, post-processes are often made step by step by combining a plurality of finishers. For example, after a plurality of finished pages are imposed on a sheet and are printed using a printer, the sheet is cut using a first finisher (near-line finisher 1), and the cut sheets undergo case binding+three-side trimming using a second finisher (near-line finisher 2).

The bookbinding application 104 provides, to the user, a function of loading the book file 103, and allowing the user to edit that file. When the book file 103 edited using the bookbinding application 104 is to be printed, the bookbinding application 104 launches an electronic original document despooler 105. This electronic original document despooler 105 reads out a designated book file from the hard disk, and outputs it to the printer driver 106. Then, print data is generated based on the book file, and is transmitted to a printer. Reference numeral 108 denotes near-line finishers as post-processing devices which apply post-processes to output matters of a printer 107. The electronic original document despooler 105 generates a job ticket (instruction information) required to control the near-line finishers 108 based on a user instruction using the bookbinding application, and transmits it to the near-line finishers 108. The user sets printed materials (print results) output from the printer 107 on the corresponding near-line finisher 108. In this case, since identification information of a job (print job) is input to the finishers 108, the finishers 108 apply post-processes to sheets as the print results based on a job ticket corresponding to the input identification information. Note that the electronic original document despooler 105 generates a job ticket required to control the printer based on a user instruction using the bookbinding application, and transmits it to the printer.

<Format of Electronic Original Document Data>

A data format of "book file" will be described below. The book file has a layer structure of three layers which imitate a book of paper media. An upper layer is called "book", which imitates a copy of book, and define attributes associated with the entire book. An intermediate layer below the upper layer corresponds to a chapter in case of a book, and is also called "chapter". For each "chapter", chapter-dependent attributes can be defined. A lower layer is "page", and corresponds to each page defined by the application program. For each "page", page-dependent attributes can be defined. Note that one "book" can include a plurality of "chapters", and one "chapter" can include a plurality of "pages".

Figure 2A:
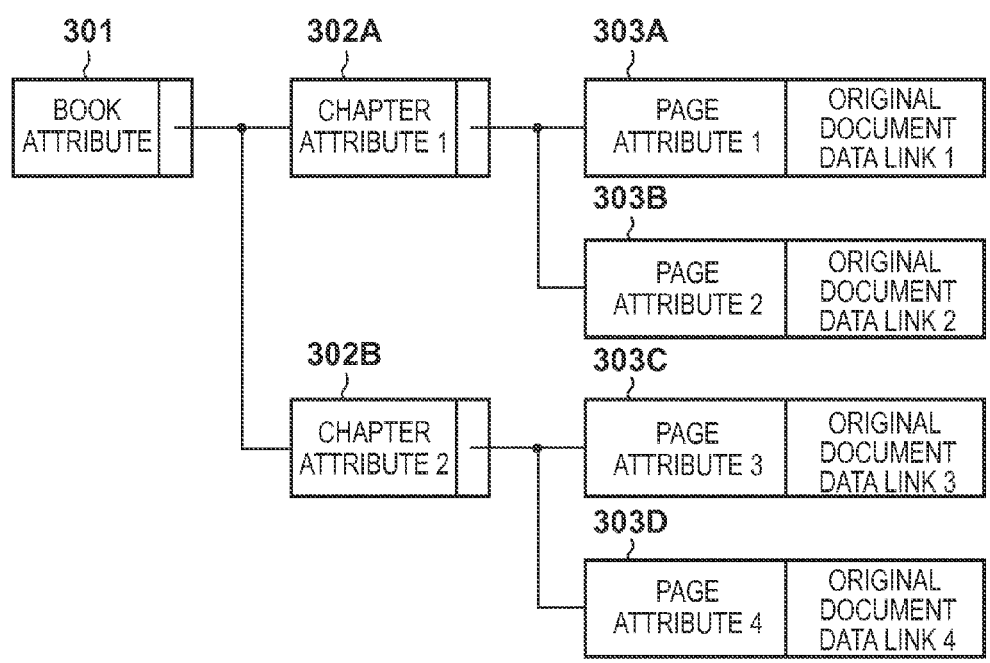
FIGS. 2A and 2B are views showing an example of the structure of a book file.

FIG. 2A shows an example of the book file format. In a book file of this example, "book", "chapter", and "page" are respectively indicated by corresponding nodes. One book file includes one "book". Since "book" and "chapter" are concepts required to define a structure as "book", they include defined attribute values and links to lower layers as their entities. "Page" has data for each "page" output by the application program as an entity. For this reason, "page" includes an entity (original document page data) of an original document page and a link to each original document page data in addition to its attribute values. Note that a physical page (a face of a single sheet) upon outputting onto a paper medium or the like often includes a plurality of original document pages. This structure, that is, imposition is not displayed by links, but it is displayed as attributes of respective layers "book", "chapter", and "page".

In FIG. 2A, book attributes are defined in the book 301, and two chapters 302A and 302B are linked to the book 301. These links indicate that the chapters 302A and 302B are included in the book 301. Furthermore, to the chapter 302A, pages 303A and 303B are linked to indicate that the chapter includes these pages. In the respective pages 303A and 303B, attribute values of these pages are defined, and these pages include links to original document page data 1 and 2 as their entities. These links indicate original document data 1 and 2 of original document page data 304 shown in FIG. 2B, that is, they indicate that entities of the pages 303A and 303B are original document page data 1 and 2.

Likewise, the chapter 302B include pages 303C and 303D, which include links to original document page data 3 and 4 as their entities. These links indicate original document data 3 and 4 of the original document page data 304 shown in FIG. 2B, that is, they indicate that entities of the pages 303C and 303D are original document page data 3 and 4.

FIGS. 3A and 3B shows an example of book attributes (document setting information) according to the embodiment of the present invention.

Normally, as for items which can be redundantly defined in the lower layer, attribute values of the lower layer are preferentially adopted. For this reason, as for items included in only book attributes, values defined in the book attributes are effective throughout the entire book. However, attribute values of items which are redundantly defined in the lower layer have meanings as prescribed values when they are not defined in the lower layer. However, in this example, as will be described later, whether or not to prioritize attribute values of the lower layer can be selected. Items unique to the book attributes will be described below.

<Print Attribute of Electronic Original Document Data (Print Setting Information)>

As a print method attribute, three values, that is, single-sided print, double-sided print, and bookbinding print, can be designated. As a finished size attribute, two values, that is, a fixed size and user designated size can be designated. The finished size attribute indicates a size of final printed materials which are left after a print sheet indicated by a paper size is trimmed. In the present invention, the finished size can be set independently of the paper size. The finished size is set to be not more than the paper size. Also, in case of a specific print method set with the finished size, a paper size is defined in only the book attributes, and cannot be set in chapter attributes (to be described later).

An "imposition type" attribute is an item used to designate an imposition type when the user wants to imposition and print a plurality of pages on a single sheet face under the condition that an output sheet is trimmed and bound using finishers. Imposition types that can be designated include "leaf, saddle stitching, casing-in, quarto, and the like".

Note that "leaf" is an imposition method of a physical pages on a sheet in a format which can bind the sheet without folding upon finishing. "Saddle stitching" is an imposition method of pages in an order suited to a format which bundles sheets as many as the number to be separately designated, folds the bundle in two, and stitches the bundle to allow bookbinding.

Also, "casing-in (case binding)" is an imposition method of pages on a glued-on cover and inner sheets in a format that allows case binding. Then, the printed inner sheets are glued at their binding position and are bound by the glued-on cover, and then undergo three-side trimming as needed.

"Quarto" is an imposition method of pages in a format which allows adhesive binding when output sheets are folded in four and are bundled. Note that adhesive binding is realized by three- or four-side trimming using an offline finisher. In addition to designation of these imposition methods, a "nesting" setting which imposes finished pages in a nested pattern is also stored as a part of the imposition type attribute.

A register mark/offcut region attribute is an item to be designated when printing of register marks and offcut regions (offcut margins) are to be designated on a physical page upon printing an electronic original document file.

An offcut region (offcut width) can be given to respective sides of a finished page, and represents a width to be offcut when a print sheet is trimmed. A register mark (offcut position mark or folding position mark) is a mark indicating a position where the user offcuts using an offline finisher. Double marks as one type of register marks includes outer and inner marks, and a width between these marks corresponds to an offcut region. An offcut position gap is permitted if it falls within a range between the outer and inner marks, and the offcut region is an offcut margin with respect to a trimming position gap. In the example of FIGS. 3A and 3B, the register mark/offcut region attribute allows only an ON/OFF setting on printed materials, but may include its type and offcut region width setting. A register mark indicating a folding position is especially called a fold mark.

A binding margin/binding direction attribute can select a document binding direction from long-side binding (left), long-side binding (right), short-side binding (top), and short-side binding (bottom) when a paper orientation is "portrait". Also, this attribute can select the document binding direction from long-side binding (top), long-side binding (bottom), short-side binding (left), and short-side binding (right) when a paper orientation is "landscape". A binding margin indicates a width of a margin region given to the binding direction side.

As a bookbinding detail attribute, when the imposition type of "saddle stitching", "casing-in", "quarto", or the like is designated, a page-spread direction, the number of sheets as a bundle, a binding margin (width), a gutter shift, and the like can be designated.

A front cover/back cover attribute includes designation of addition of a sheet used as a front cover and back cover, and designation of print contents on the added sheet when an electronic original document file combined as a book is to be printed.

A finishing attribute is an item required to designate whether or not saddle stitching or case binding, three-side trimming, or the like is applied to discharged sheets. The validity of this attribute depends on whether or not the printer or finishers to be used have that function.

A glued-on cover paper size is a paper size which can be set when "casing-in (case binding)" is selected as the imposition type, that is, a paper size of a cover required to bind inner sheets. Note that the aforementioned finished size indicates that of the inner sheets, and the finished size of the glued-on cover can be calculated from this finished size of the inner sheets. Hence, in this embodiment, the finished size of the glued-on cover is not held as an attribute.

Like the inner sheets, the glued-on cover paper size assumes a value larger than the glued-on cover finished size. The glued-on cover finished size is calculated by "inner sheet finished size×2+spine width". This is because the glued-on cover finished size is a sum of a front cover size, back cover size, and spine size, and the front cover size and back cover size are equal to the inner sheet finished size in this embodiment. Note that the spine width is calculated from a product of the thickness of inner sheet paper decided by an inner sheet paper type, and the number of inner sheets.

A finish enlargement/reduction attribute=ON indicates that input original document pages are enlarged/reduced to fit to the finished paper size.

An offcut enlargement/reduction attribute=ON indicates that input original document pages are enlarged/reduced to fit a size including offcut regions set at four sides of the finished paper size.

A paper size attribute indicates a size of a print sheet, as described above, and can be switched for each chapter when neither case binding nor twofold bookbinding (corresponding to the bookbinding print above) is selected.

A paper orientation attribute indicates "portrait" or "landscape".

An N-up print designation attribute is an item required to designate the number of original document pages to be printed on one physical page (face of a single paper sheet). When the enlargement/reduction attribute=ON, this attribute indicates to enlarge/reduce input original document pages to fit an output paper size.

A discharge method attribute is an item required to designate whether or not discharged sheets are to undergo stapling.

As for chapter attributes, there are no items unique to a chapter, and all items overlap the book attributes. Therefore, normally, when definitions in the chapter attributes are different from those in the book attributes, values defined by the chapter attributes are preferentially used. However, in this example, whether or not to prioritize attribute values of the lower layer can be selected.

Items unique to page attributes include a page rotation designation attribute, zoom attribute, layout position attribute, annotation attribute, page division attribute, and the like. The page rotation designation attribute is an item required to designate a rotation angle when an original document page is laid out on a physical page. The zoom attribute is an item required to designate a zoom ratio of an original document page. The zoom ratio is designated to have a size of a virtual logical page region as 100%. The virtual logical page region is a region occupied by one original document page when original document pages are laid out according to N-up designation or the like. For example, in case of 1×1, the virtual logical page region corresponds to one physical page. In case of 1×2, the virtual logical page region is a region obtained by reducing respective sides of one physical page to about 70%.

The bookbinding application 104 generates and stores the print attributes exemplified above in association with a book file (electronic original document file) or as a part of that file as settable items.

<Book File Generation Sequence>

The sequence for generating a book file by the bookbinding application 104 and electronic original document writer 102 will be described below.

Figure 4:
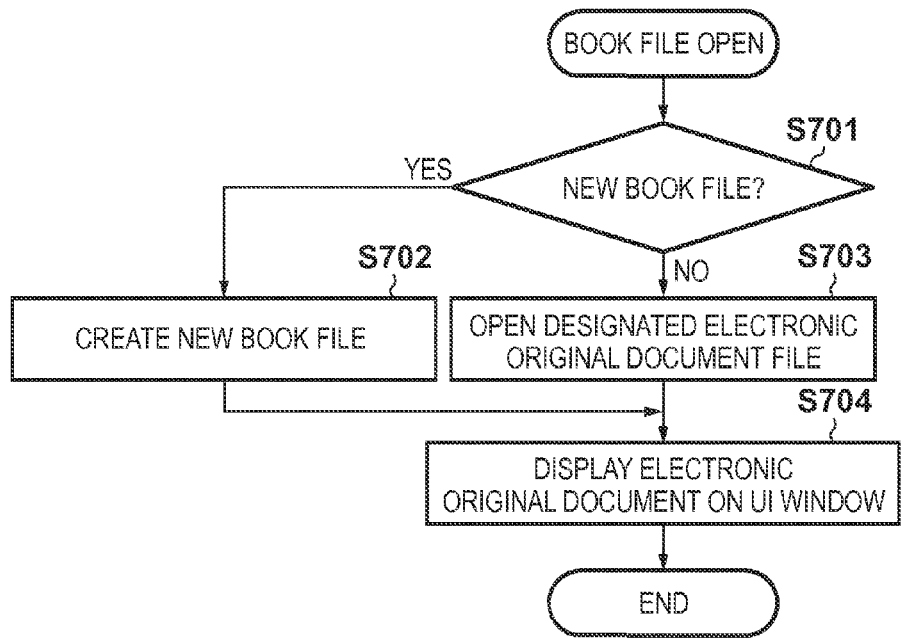
FIG. 4 is a flowchart for explaining the sequence for opening a book file.

FIG. 4 is a flowchart for explaining the sequence when the bookbinding application 104 according to this embodiment opens a book file.

The bookbinding application 104 determines in step S701 whether a book file to be opened is a new file to be generated or an existing file. If a new file is to be generated, the process advances to step S702, and the bookbinding application 104 generates a new book file which does not include any chapter. The newly generated book file includes only a book node 301 and does not include any link to a chapter node, in case of the example of FIG. 2A. As book attributes in this case, an attribute set prepared in advance for a new file is applied. Then, the process advances to step S704, and the bookbinding application 104 displays a user interface (UI) window used to edit the new book file.

Figure 8:
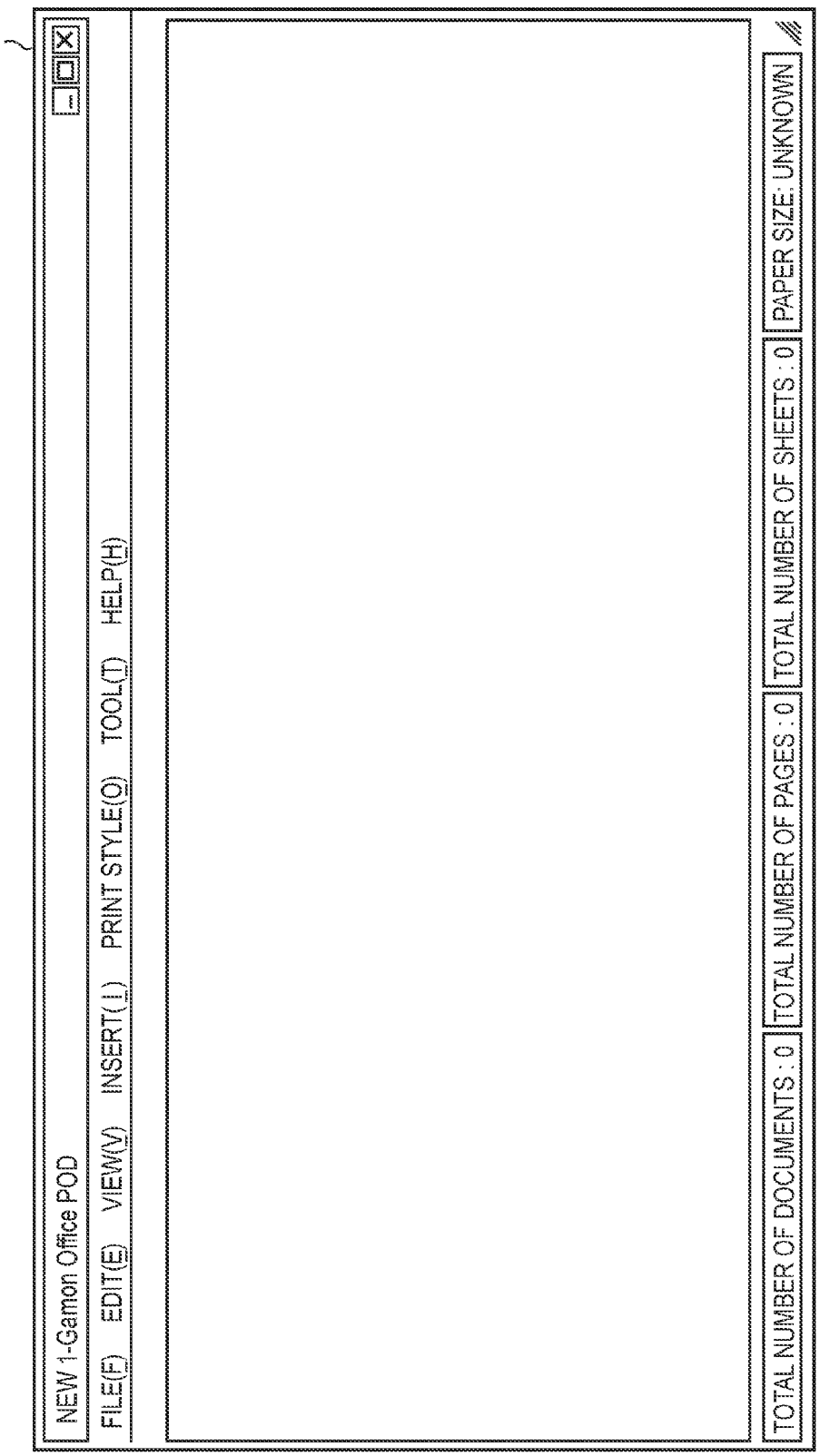
FIG. 8 is a view showing an example of a user interface window when a new book file is opened.

FIG. 8 shows an example of the UI window when a new book file is generated. In this case, since the book file does not have any practical contents, nothing is displayed on a UI window 1100.

Figure 7:
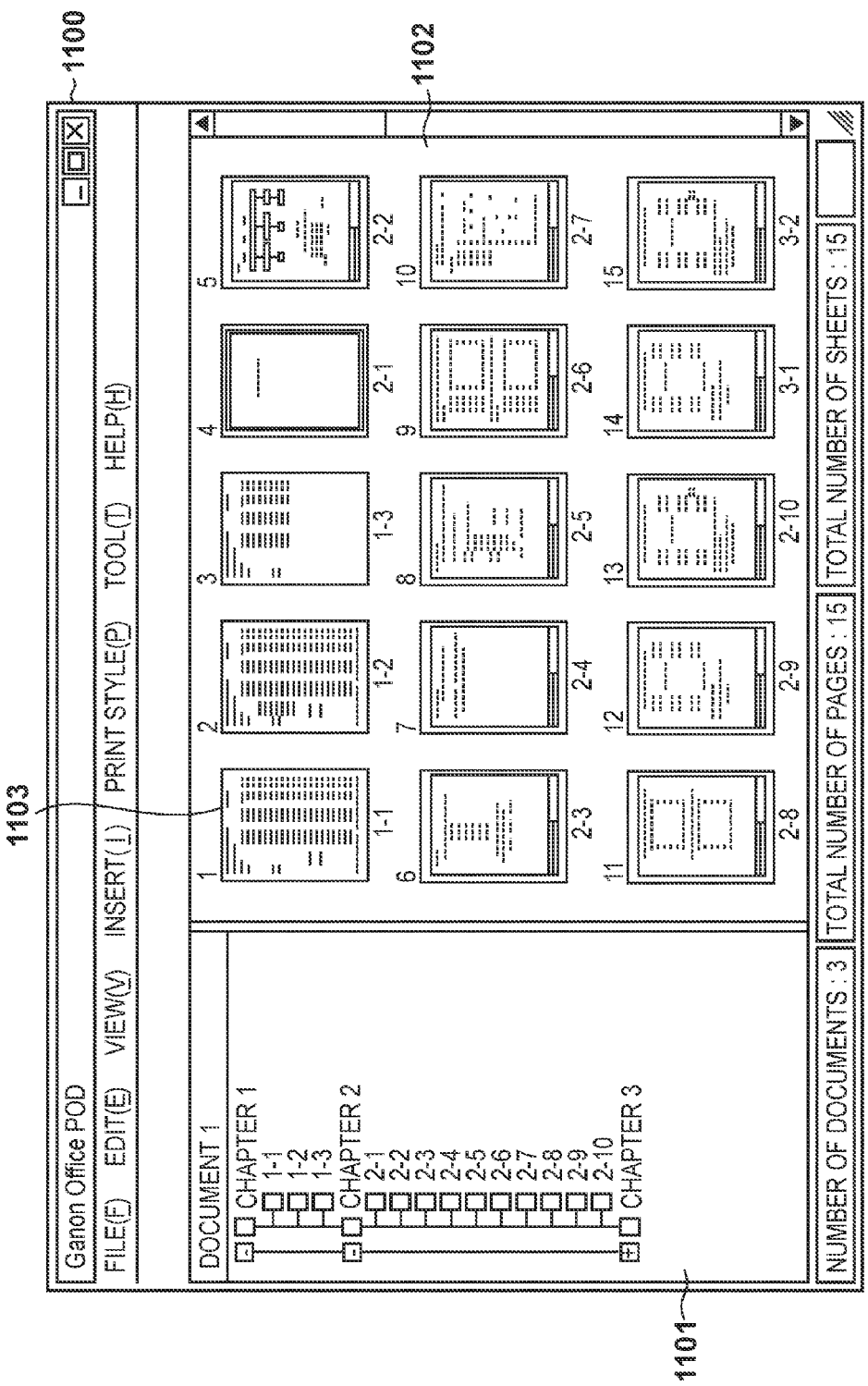
FIG. 7 is a view showing an example of a user interface window when an existing book file is opened.

On the other hand, if an existing book file is designated in step S701, the process advances to step S703, and the bookbinding application 104 opens the designated book file to display a user interface (UI) window according to the structure, attributes, and contents of that book file. FIG. 7 shows an example of the displayed UI window.

This UI window 1100 includes a tree area 1101 which displays the structure of the book, and a preview area 1102 which displays printed states. The tree area 1101 displays chapters included in that book, and pages included in each chapter to have a tree structure shown in FIG. 2A above. The tree area 1101 displays page numbers, which indicate original document page numbers. The preview area 1102 displays contents of physical pages in a reduced scale. The display order reflects the structure of the book.

To a book file, application data converted into an electronic original document file can be added as a new chapter. This function is called "electronic original document import function". By importing application data to a newly generated book file according to the sequence shown in the flowchart of FIG. 5, entities are given to the book file. This function is activated when the user drags and drops application data on the window of FIG. 7.

Figure 5:
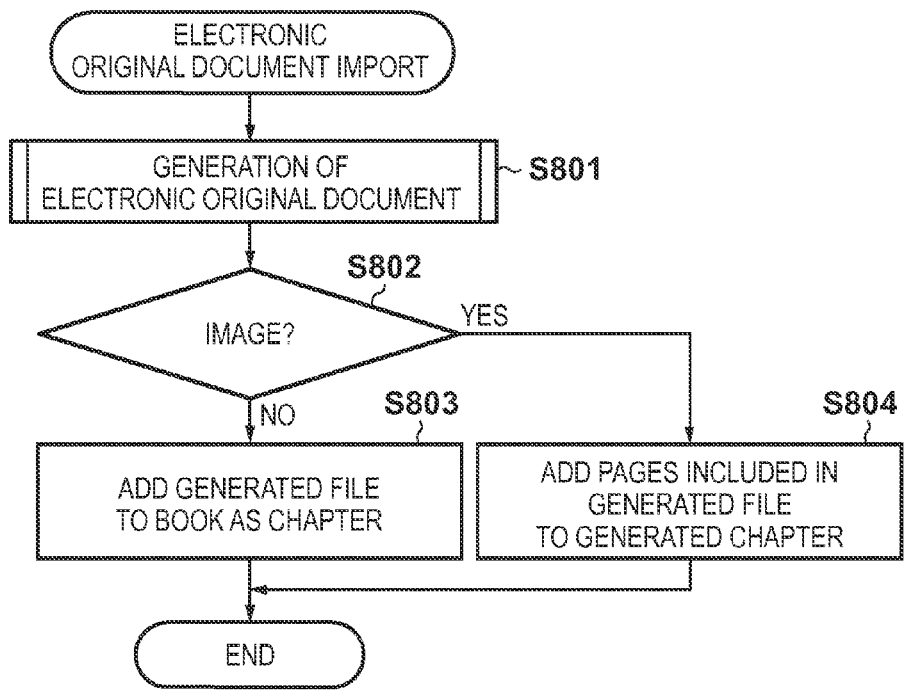
FIG. 5 is a flowchart for explaining the sequence for importing an electronic original document file into a book file.

FIG. 5 is a flowchart showing the electronic original document import sequence according to this embodiment. Initially, an application program used to generate designated application data is launched, and is controlled to print the application data while designating the electronic original document writer 102 as a printer driver, thereby converting the application data into electronic original document data (step S801). Upon completion of the conversion into the electronic original document data, the process advances to step S802 to determine whether or not the converted data is image data. This determination step can be attained based on a file extension of the application data under, for example, the Windows OS. Also, in case of such image data, an electronic original document file can be directly generated from the image data without launching the application unlike in step S801. Hence, the process of step S801 can be omitted.

If the application data is not image data in step S802, the process advances to step S803, and the electronic original document file generated in step S801 is added to the book of the currently opened book file as a new chapter. In this case, as chapter attributes, values of those common to book attributes are copied, and attributes which are not common to the book attributes are set to be prescribed values prepared in advance.

If the application data is image data in step S802, the process advances to step S804, and original document pages included in the electronic original document file generated in step S801 are added to a designated chapter without adding a new chapter in principle. However, when the book file is a newly generated file, a new chapter is created, and respective pages of the electronic original document file are added as those which belong to that chapter. Note that as page attributes, attribute values of those which are common to attributes of the upper layers are given, and values of attributes which are defined in the application data and inherited to the electronic original document file are given. For example, when "N-up print designation" or the like is designated in the application data, its attribute value is inherited. In this manner, the new book file is generated, or the new chapter is added.

Figure 6:
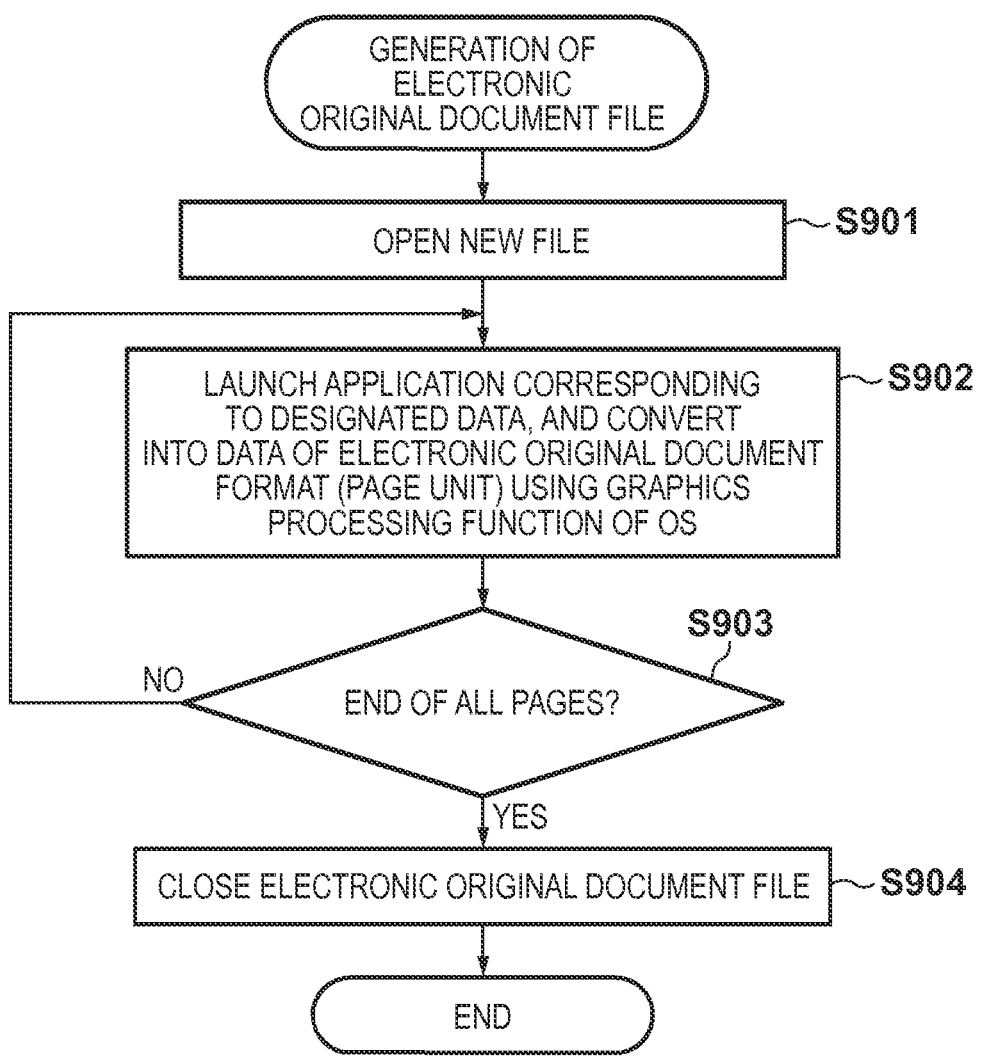
FIG. 6 is a flowchart for explaining the sequence for converting application data into an electronic original document file.

FIG. 6 is a flowchart showing the sequence for controlling the electronic original document writer 102 to generate an electronic original document file in step S801 of FIG. 8.

Figure 2B:

In step S901, a new electronic original document file is created and opened. The process then advances to step S902, and an application corresponding to the designated application data is launched to transmit an output command to an output module of the OS while designating the electronic original document writer 102 as a printer driver. This output module converts the received output command into data in the electronic original document format by the electronic original document writer, and outputs the converted data. In this case, the output destination is the electronic original document file opened in step S901. The process then advances to step S903 to determine whether or not conversion of all designated data is complete. If the conversion is complete, the process advances to step S904 to close the electronic original document file. In this manner, the electronic original document file generated by the electronic original document writer 102 is a file including entities of original document page data, as shown in FIG. 2B above.

<Edit of Book File>

As described above, a book file can be generated from application data. In the book file generated in this way, edit operations such as new addition, deletion, copy, move, and chapter name change can be made with respect to chapters and pages.

In addition, edit operations such as a combination of a plurality of book files, re-layouts of chapters and pages in a book file, deletion of chapters and pages in a book file, layout changes of original document pages, and insertion of slip sheets and index sheets can be made. When the user makes these operations, operation results are reflected to the attributes shown in FIGS. 3A and 3B or to the structure of the book file. For example, when the user makes an addition operation of a new blank page, the blank page is inserted to a designated position. This blank page is handled as an original document page. On the other hand, when the user changes a layout for original document pages, the change contents are reflected to attributes such as a print method, N-up print, front/back cover, index sheets, slip sheets, and chapter divisions.

<Output of Book File>

The final goal of the book file, which is generated and edited, as described above, is a print output operation. When the user selects a file menu from the UI window 1100 of the bookbinding application shown in FIG. 7, and then selects "print", a print operation is executed by a designated output device. In this case, the bookbinding application 104 generates a job ticket from the currently opened book file, and passes it to the electronic original document despooler 105. Then, data issued from the electronic original document despooler 105 is converted into print data by a printer driver, thus executing print processing.

A data structure in the job ticket defines layouts of original document pages on sheets. One job ticket is issued per job. For this reason, the data structure includes a document node in an uppermost layer, and defines attributes of an entire document, for example, double-sided print/single-sided print and the like. Paper nodes belong to the data structure below the uppermost node, and include attributes such as identifiers of paper sheets to be used and designation of paper feed ports in a printer. To each paper node, a node of a sheet to be printed using that paper sheet belongs. One sheet corresponds to one print sheet, and physical pages belong to each sheet. In case of single-sided print, one physical page belongs to one sheet; and in case of double-sided print, two physical pages belong to one sheet. To each physical page, an original document page to be laid out on that page belongs. Attributes of the physical page includes a layout of the original document page.

The electronic original document despooler 105 converts the aforementioned job ticket into output commands to an output module.

<Another System Arrangement>

An overview of the document processing system according to this embodiment is a standalone system. However, even by a server-client system by extending the standalone system, a book file is generated and edited by nearly the same arrangement and sequence. However, book files and print processing are managed by a server.

<Preview Display Contents>

When a book file is opened by the bookbinding application, the user interface window 1100 shown in FIG. 7 is displayed. In this case, the tree area 1101 displays a tree indicating the structure of an opened book (to be referred to as "book of interest" hereinafter). The arrangement of the document processing system including the host computer 100 (information processing apparatus) and printer 107 applicable to this embodiment will be described below. Note that the printer 107 is applicable to either a local printer connected to a client or a printer connected to a server.

<Hardware of Document Processing System>

Figure 9:
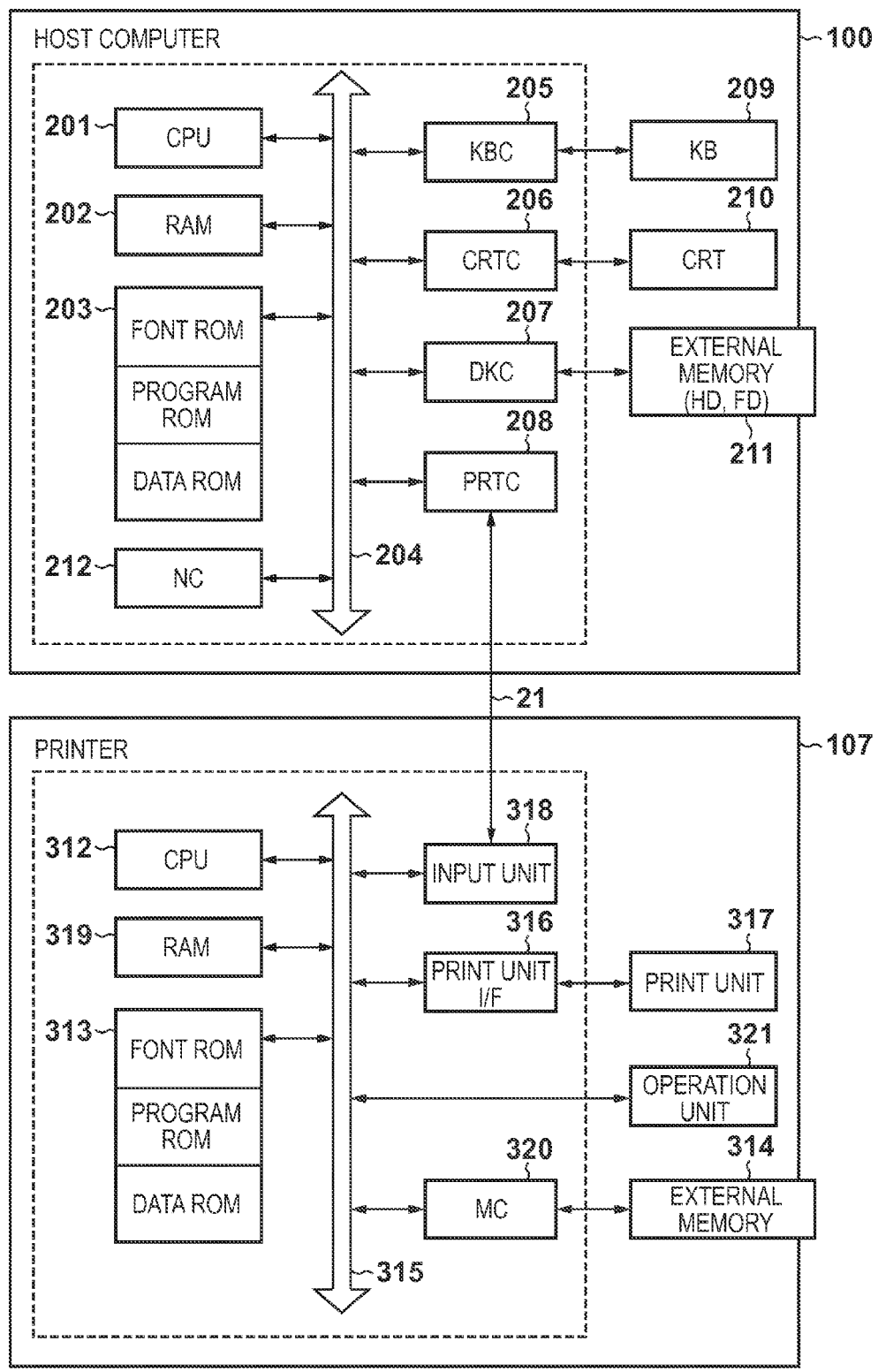
FIG. 9 is a block diagram showing an example of the hardware arrangement which implements the document processing system of this embodiment.

FIG. 9 is a block diagram showing the hardware arrangement of the document processing system according to the embodiment of the present invention. Note that the present invention is applicable to a standalone apparatus, a system including a plurality of apparatuses, or a system in which apparatuses are connected via a network such as a LAN or WAN to implement processing as long as the functions of the present application are executed. The host computer 100 is a block diagram showing the hardware arrangement of the digital computer 100 shown in FIG. 1. A CPU 201 executes an OS and programs including the general application 101, bookbinding application 104, and the like, which are stored in a program ROM of a ROM 203 or are loaded from a hard disk 211 onto a RAM 202. Thus, the software arrangement shown in FIG. 1 and the flowcharts of the present application are implemented. That is, respective steps of the flowcharts of the present application are implemented when the CPU 201 reads out related programs and executes the readout programs. The RAM 202 functions as a main memory, work area, and the like of the CPU 201. A keyboard controller (KBC) 205 controls key inputs from a keyboard 209 and a pointing device (not shown). A CRT controller (CRTC) 206 controls display of a display unit 210. Note that the display unit 210 is not limited to a CRT but may be, for example, a liquid crystal panel. A disk controller (DKC) 207 controls accesses to the hard disk (HD) 211, a Floppy® disk (not shown), and the like, which store a boot program, various applications, font data, user files, edit files (to be described later), and the like. A PRTC 208 controls exchanges of signals with the printer 107. An NC 212 is connected to a network, and executes communication control processing with other apparatuses connected to the network. Assume that the host computer 100 includes the files, applications, despooler, driver, and the like described above with reference to FIG. 1. The electronic original document file 103 is opened by the bookbinding application 104. The bookbinding application 104 displays, for example, the operation window shown in FIG. 7 above on the display unit 210, and displays the electronic original document file on that window. A major difference between the bookbinding application 104 and general application 101 is that the bookbinding application 104 includes a print setting information setting function which is normally provided by the printer driver 106. With this print setting function, the bookbinding application 104 can set functions (stapling, punch hole, and the like) of the printer 107 and finishers for an electronic original document in addition to edit functions (replacement of a page order of a document, copy, deletion, and the like). Note that the bookbinding application 104 described in this embodiment will also be referred to as a print setting application.

The printer (image processing apparatus) 107 is a block diagram showing the hardware arrangement of the printer 107 shown in FIG. 1, and is controlled by a CPU 312. The CPU 312 outputs an image signal as output information to a print unit (engine) 317 connected to a system bus 315 based on control programs which are stored in a ROM 313 and external memory 314 and are loaded onto a RAM 319. Also, a program ROM of this ROM 313 stores control programs of the CPU 312. A font ROM of the ROM 313 stores font data and the like used when the output information is generated. A data ROM of the ROM 313 stores information and the like used by the host computer 100 in case of the printer which does not include the external memory 314 such as a hard disk.

The CPU 312 can execute communication processing with the host computer 100 via an input unit 318, and can notify the host computer 100 of information and the like of the printer 107. The RAMA 319 functions as a main memory, work area, and the like of the CPU 312, and is configured to extend its memory capacity by an optional RAM connected to an expansion port (not shown). Note that the RAM 319 is used as an output information expansion area, environment data storage area, NVRAM, and the like. Accesses to the external memory 314 such as the hard disk (HD) or an IC card are controlled by a memory controller (MC) 320. The external memory 314 is connected as an option, and stores font data, emulation programs, form data, and the like. On an operation panel 321, switches required for operations, LED indicators, and the like are arranged.

The number of external memories 314 described above is not limited to one. Alternatively, a plurality of external memories 314 including an optional card in addition to internal fonts, and an external memory storing programs used to interpret printer control languages of different language systems may be connected. Furthermore, an NVRAM (not shown) may be included, and may store printer mode setting information from the operation panel 321.

<Print by Combining Printer and Near-line Finisher>

An example of a problem assumed by the invention according to this embodiment will be described below. For example, in case of finishing by three-side trimming after bookbinding, when a plurality of pages are imposed on one sheet, a process for cutting the sheet for bookbinding, and a process for applying three-side trimming after bookbinding are often required to be executed. In this case, since the post-processes include two trimming processes, register marks for these trimming processes have to be printed. Some of conventional imposition software programs can designate one set of register marks by a simple operation, but no imposition software which can designate two or more sets of register marks by a simple operation is available. For this reason, an operator has to create an image including register marks and lay it out on a sheet surface, thus posing problems in terms of operability and accuracy. When a plurality of post-processes (for example, trimming) are to be executed, a finished page indicating a finished size of products (printed materials) obtained by the first post-process and that indicating a finished size of products obtained by the second post-process have to be imposed in a nested manner. More specifically, there are two types of finished pages of an intermediate finished size obtained after cutting by near-line finisher 1 and a final finished size obtained after three-side trimming by near-line finisher 2. For this reason, on printed materials printed by the printer, finished page having the final finished sizes as products of near-line finisher 2 have to be drawn in finished pages having the intermediate finished size as products of near-line finisher 1 in a nested manner.

Original document data without any register marks indicating trimming positions may often be input in the POD. In such case, the user has to add register marks using design software or the like so as to cope with a plurality of post-processes, and then has to set layouts using imposition software, thus increasing the load on the user. As the number of finishers used in post-processes is larger, a heavier operation load is imposed.

A job ticket required to instruct post-processes to respective near-line finishers has to describe parameters such as post-process contents and positions of the respective finishers. When a plurality of post-processes are executed as in the aforementioned case, job tickets for respective post-processes have to describe different finishing instructions and parameters indicating trimming positions, thus also increasing the operation load.

When products are to be generated by combining the printer and near-line finishers, the bookbinding application 104 according to this embodiment can simultaneously instruct the printer and near-line finishers using a job ticket in a JDF format. Note that the "JDF" is short for "Job Definition Format". A job ticket is often called JDF. Setting processing required for the user via the UI of the bookbinding application 104 so as to simultaneously issue print and post-process instructions to the printer and near-line finishers will be described below.

Figure 10:
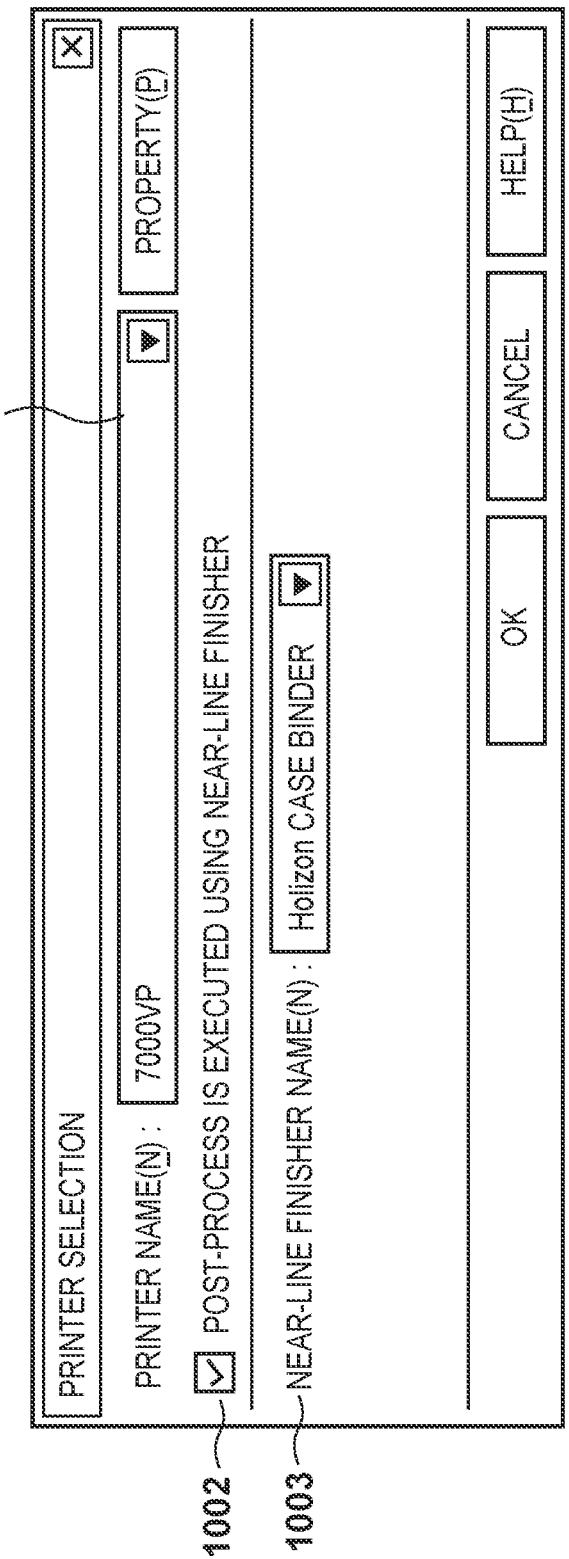
FIG. 10 is a view showing an example of a user interface window used to select a printer.

FIG. 10 shows a display example of a "printer selection" window by the bookbinding application 104 of the document processing system according to this embodiment. The user can select a printer used to print a book file, and a type of near-line finisher used in a post-process after the print process. In FIG. 10, a selection box 1001 is an area used to designate a printer to be used in a print process. A check box 1002 described with "post-process is executed using near-line finisher" is used to set whether or not a finishing instruction is also issued to a near-line finisher at the time of execution of a print process. Note that the finishing instruction in this case is implemented by, for example, issuing a job ticket. A selection box 1003 is an area used to designate a type of near-line finisher used to execute a finishing process, and is displayed only when the check box 1002 is checked. Note that only one finisher is selected by the selection box 1003. However, in this example, a plurality of near-line finishers can be selected, as will be described later with reference to FIG. 16.

<General Document Setting>

Figure 11:
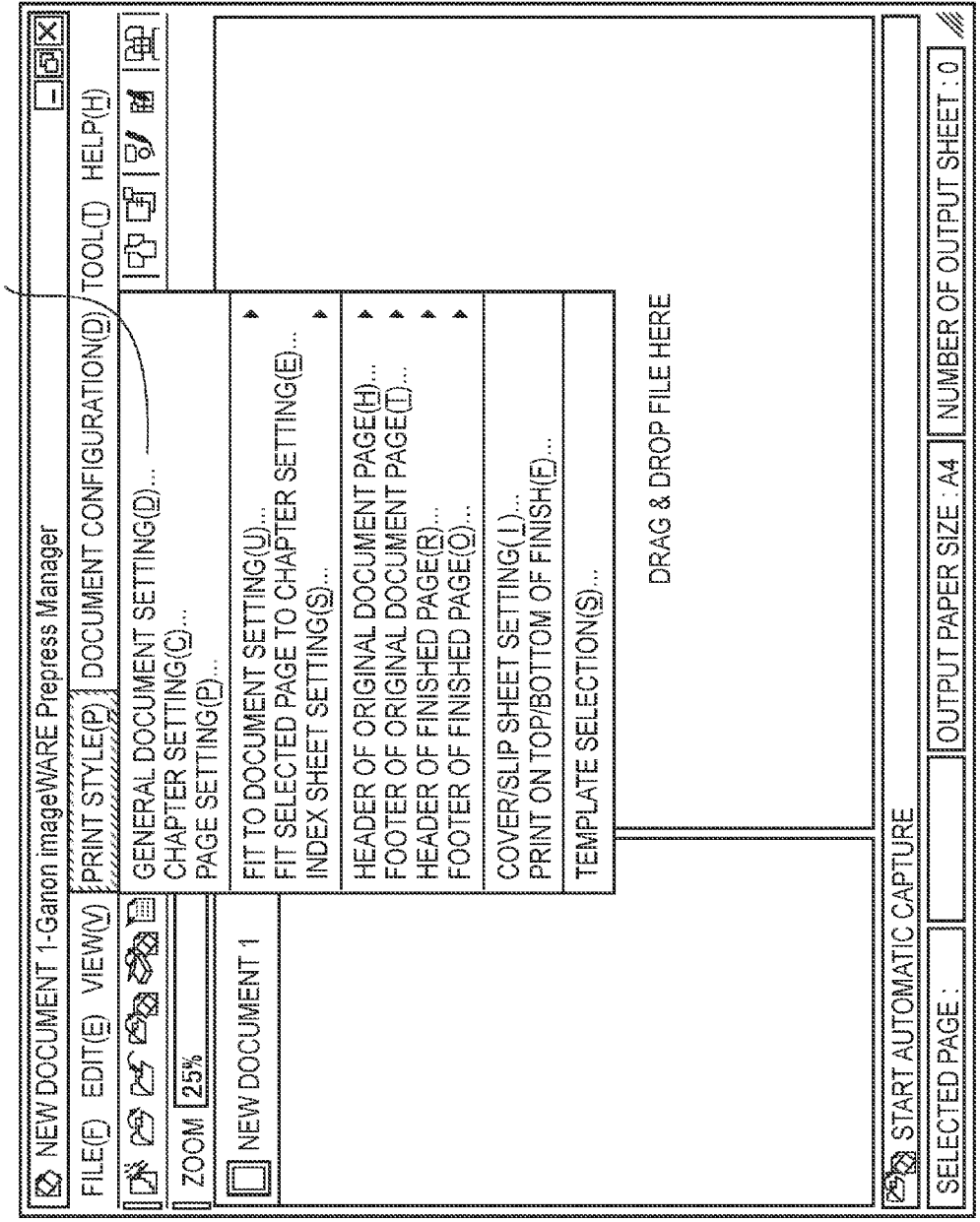
FIG. 11 is a view showing an example of a user interface window when a book file is opened.

FIG. 11 shows a display example of a window when a "print style" menu is selected on the window 1100 shown in FIG. 8. The user selects a "general document setting" button 1111, thereby displaying a "general document setting" window shown in FIGS. 12A to 12C. "General document setting" corresponds to the book attributes 301 shown in FIG. 2A.

Figure 12A:
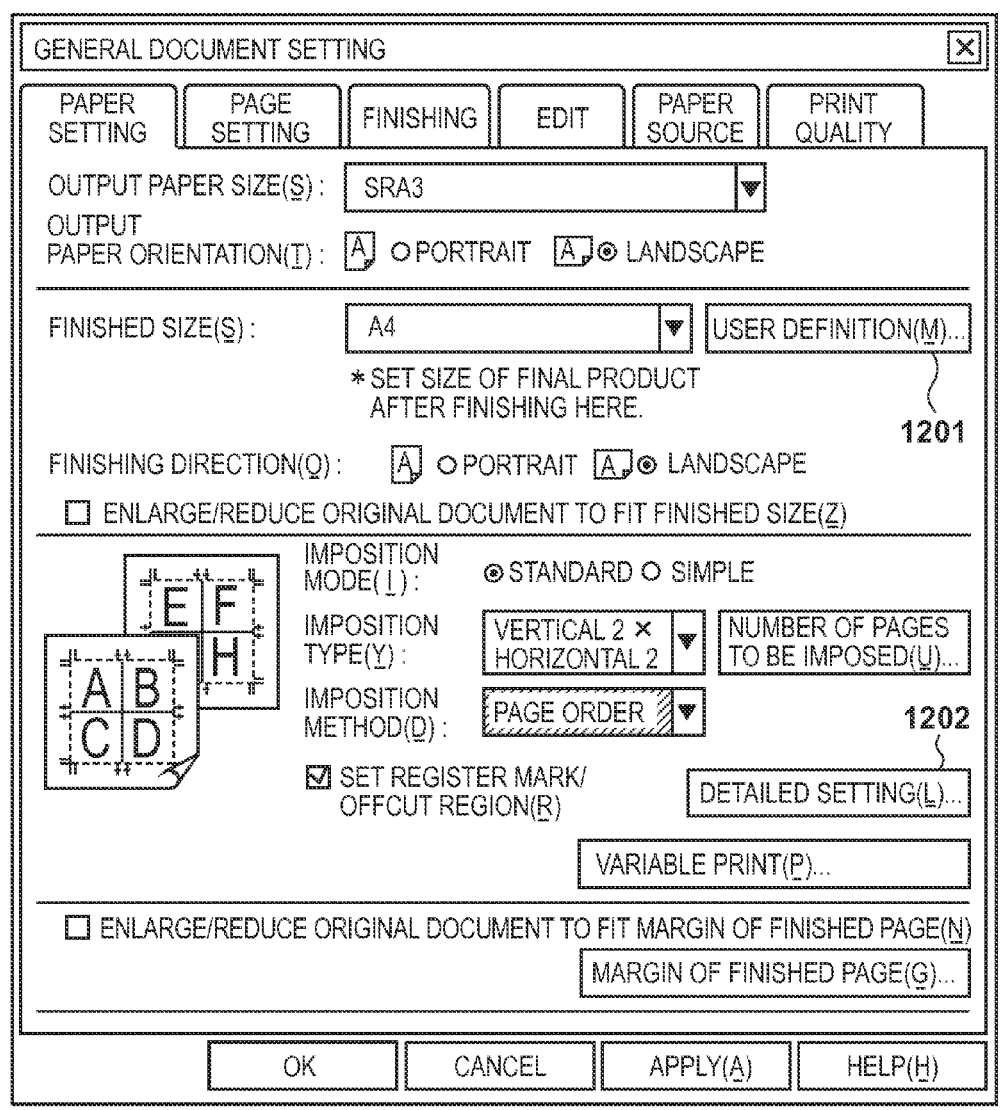
FIG. 12A is a view showing a user interface window used to set book attributes.
Figure 12C:
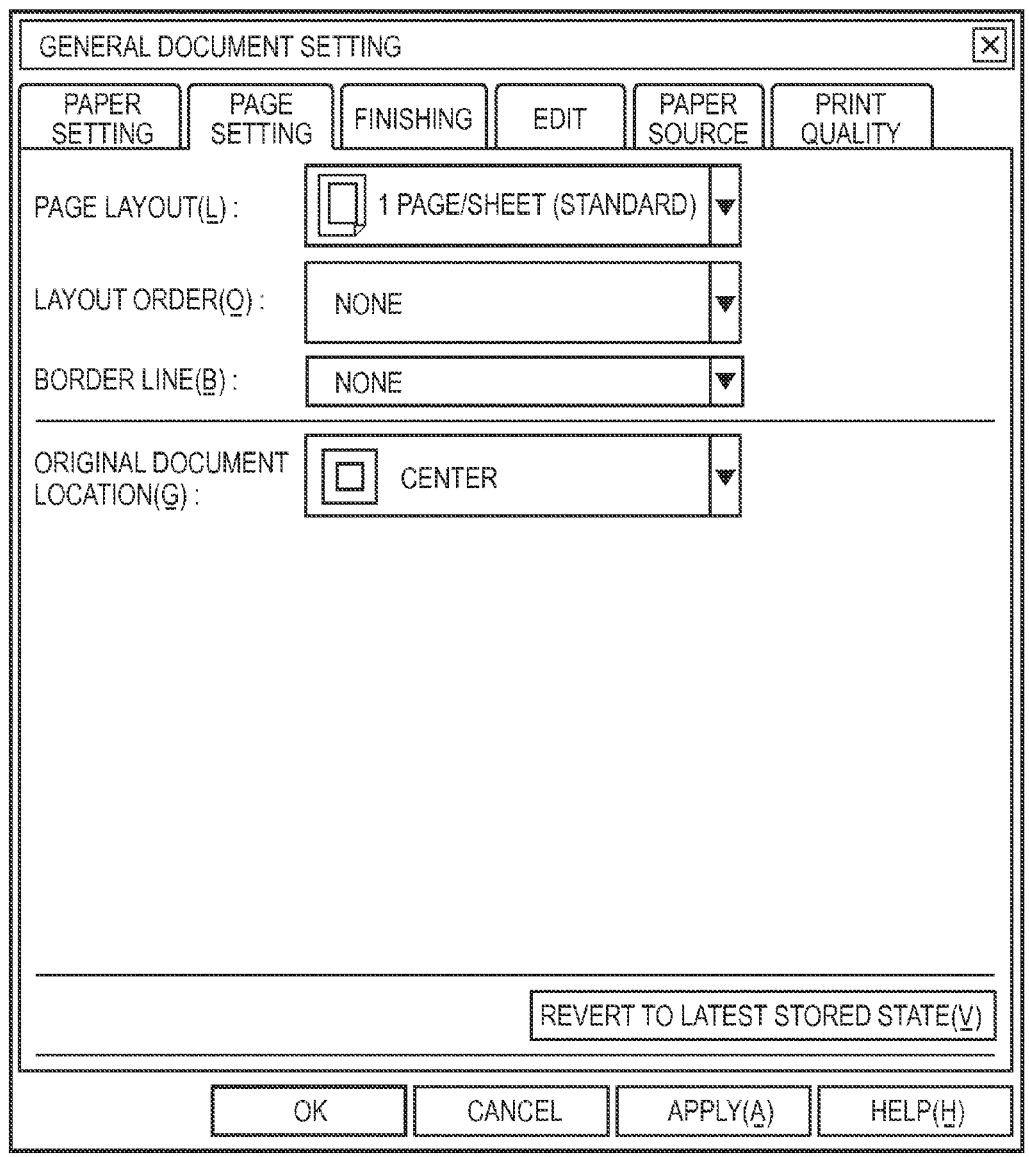
FIG. 12C is a view showing a user interface window used to set book attributes.

The "general document setting" window shown in FIGS. 12A to 12C includes six sheets including paper settings, page settings, finishing, and the like. The "general document setting" window accepts and displays "book attributes 301" such as "finished size attribute", "imposition type attribute", and "finishing attribute", which influence the entire document.

Figure 13A:
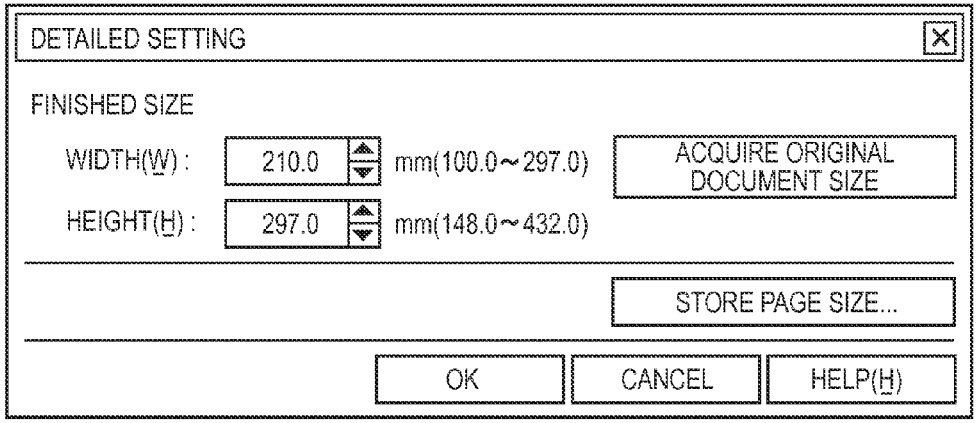
FIGS. 13A and 13B are views showing examples of user interface windows used to set book attributes.

FIG. 12A shows a display state of the paper setting sheet. This sheet can mainly make settings required to decide a layout on an output sheet, and allows to set an output paper size and direction, a finished size and direction, an imposition type, designation of the number of faces (M(vertical)×N (horizontal) layout), designation of register mark addition, designation of an offcut width, and the like. Also, windows shown in FIGS. 13A and 13B can be launched from the paper setting sheet. FIG. 13A is a "finished size designation" window launched when a "user definition" button 1201 in FIG. 12A is clicked.

The "finished size designation" window is used to designate a "finished page" size, and can designate a final finished size after an output sheet is trimmed and bound using a width (X mm) and a height (Y mm). The finished size designated on this window is a size of a finished page used in a paper layout in the bookbinding application 104. Also, the finished size can be registered as a template in a client PC. An output paper size is a size of a sheet used in a print process by the printer 107. On the other hand, a finished size is an item required to designate a size of a final product after all post-processes such as bookbinding and trimming are applied to sheets output from the printer using finishers. Note that when a user designated size is selected as the finished size in FIG. 12A, a user definition button 1201 is operable.

Figure 13B:
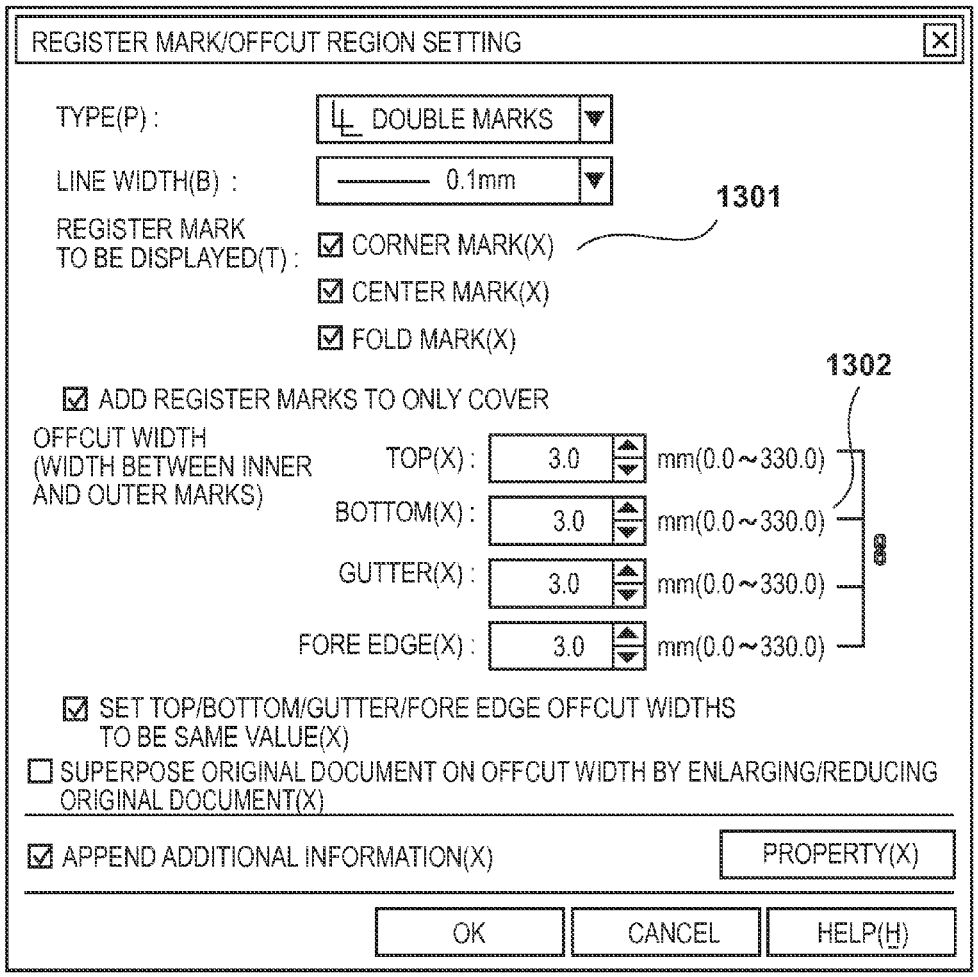

FIG. 13B shows a "register mark setting" window launched when a "detail setting" button 1202 in FIG. 12A is clicked. The "register mark setting" window accepts detailed settings (for example, a line type, line width, display position, etc.) of register marks, and offcut widths (offcut margins) at a top side/bottom size/left side/right side of the finished page (a top side/bottom size/gutter side/fore edge side in case of a bookbinding system). For example, when register marks are to be printed on a finished page, ones to be printed can be selected from a corner mark, center mark, fold mark, and the like in the check box 1301. When offcut widths are to be designated for respective sides of a finished page, they can be independently designated for the respective sides of the finished page in width designation boxes 1302.

FIG. 12B shows a display state of the finishing sheet. This sheet allows the user to designate bookbinding detailed settings including a discharge method, binding margin/binding direction, page-spread direction, gutter shift designation at the time of saddle stitching, and the like. When post-processes using finishers are to be executed, cutting, creasing, stapling, saddle stitching, case binding, three-side trimming, and the like can be designated for the finishers.

FIG. 12C shows a display state of the page setting sheet. The page setting sheet allows the user to make settings associated with a layout in each finished page on a sheet, and to instruct to make N-page print and original document location settings.

FIG. 14 is a view showing a display example of a "JDF output" window by the bookbinding application 104 of the document processing system according to this embodiment. When the user selects a file menu from the UI window 1100 of the bookbinding application 104 shown in FIG. 7, and then selects "JDF output", he or she can launch the window shown in FIG. 14. The user designates a name of a JDF, that is, a job ticket, a device used to execute a post-process, an output method, and the like on this window, and can execute a print process (or a JDF storage process) of a book file which has been set on the windows shown in FIGS. 12A to 12C.

In FIG. 14, an input box 1401 is an area used to designate "job name", and an input box 1402 is an area used to designate "user name". In both of the boxes, arbitrary character strings can be designated, and these pieces of information are also described in a JDF by the electronic original document despooler 105. A selection box 1403 is an area used to designate a printer used in a print process. Also, in the example shown in FIG. 14, a check box 1404 of "post-process is executed using near-line finisher" is checked. Thus, of the print settings made for a book file, only the print process is executed by a printer 1403, and a finishing process can be executed by a dedicated near-line finisher. More specifically, a job ticket for the printer and that for the near-line finisher are independently issued.

A selection box 1405 is an area used to designate a near-line finisher to be used to execute the finishing process, and is displayed only when the check box 1404 is checked. Note that the bookbinding application 104 launches the window shown in FIG. 14 in a state in which the "printer name" selection box 1403, "post-process is executed using near-line finisher" check box 1404, and "near-line finisher name" selection box 1405 are set in advance with the contents set on the "printer selection" window in FIG. 10. When a print execution instruction is issued by an OK button, the bookbinding application 104 starts print processing which combines the printer and near-line finisher.

Figure 15:
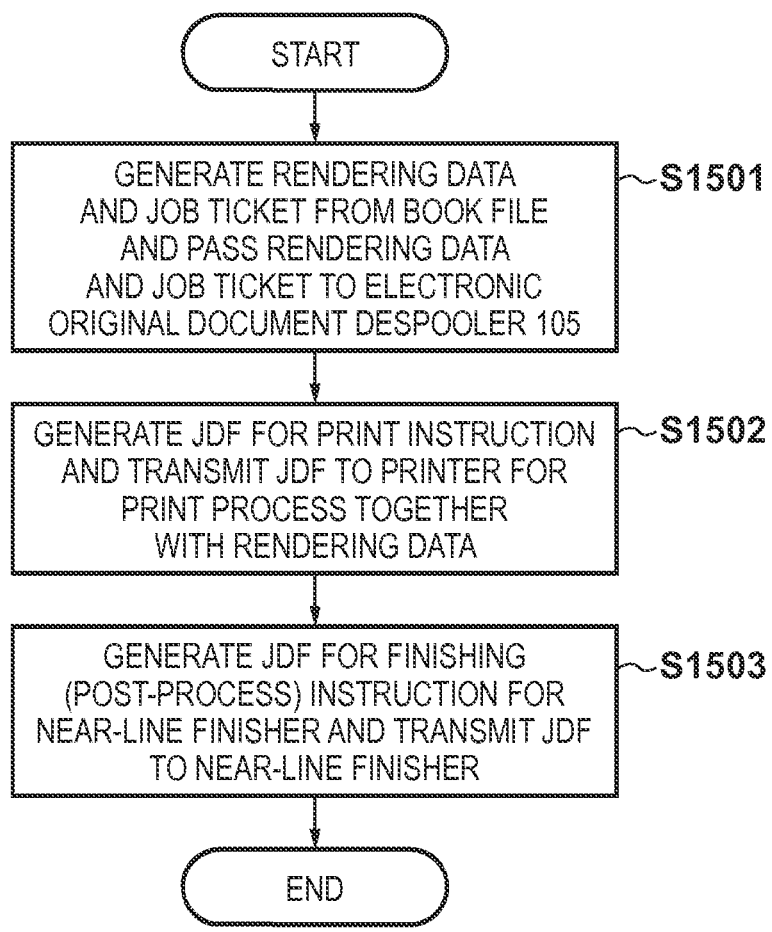
FIG. 15 is a flowchart for explaining the sequence of the JDF output process.

FIG. 15 is a flowchart showing the print processing sequence as a combination of the printer and near-line finisher by the bookbinding application 104 of the document processing system according to this embodiment. When a print instruction is input by pressing the OK button on the "JDF output" window shown in FIG. 14, the bookbinding application 104 generates rendering data and a job ticket from a book file and passes them to the electronic original document despooler 105 in step S1501. Next, in step S1502, the electronic original document despooler 105 generates a JDF (that is, a job ticket except for an instruction to the finisher) which describes only a print instruction, and transmits it to the printer for a print process together with the rendering data. Note that the printer for a print process is designated by the area 1403 in FIG. 14, thereby performing printing at the printer 107. Subsequently, in step S1503, the electronic original document despooler 105 generates a JDF (instruction information) which describes only a post-process instruction, and transmits the generated JDF to each near-line finisher 108. By transmitting this JDF, a finishing instruction is issued to the near-line finisher 108. In this case, since the printer 107 and near-line finisher 108 are not connected via a sheet convey path, the user has to carry printed sheets output on the printer 107 to the near-line finisher 108. The job ticket describes attributes of respective layers, layouts of logical pages on sheet faces using, for example, XML tags based on the attributes of the respective layers of document data (that is, a book file) exemplified in FIGS. 2A and 2B, and is generated in association with logical page data to be imposed. The job ticket for each near-line finisher describes trimming positions, sizes, and the like, and is generated and output according to "general document setting" which associates a finished size with each near-line finisher. As described above, this job ticket is output when the user presses the OK button on the JDF output window shown in FIG. 14 or 19.

<Print by Combining Two or More Near-line Finishers>

When the user wants to generate products by combining the printer and near-line finishers, the bookbinding application 104 according to this embodiment can set two or more near-line finishers.

FIGS. 16 to 20 are views showing examples of the windows shown in FIGS. 10 to 12C, which are extended to allow the user to set two or more near-line finishers when the user wants to generate products by combining the printer and near-line finisher.

Figure 16:
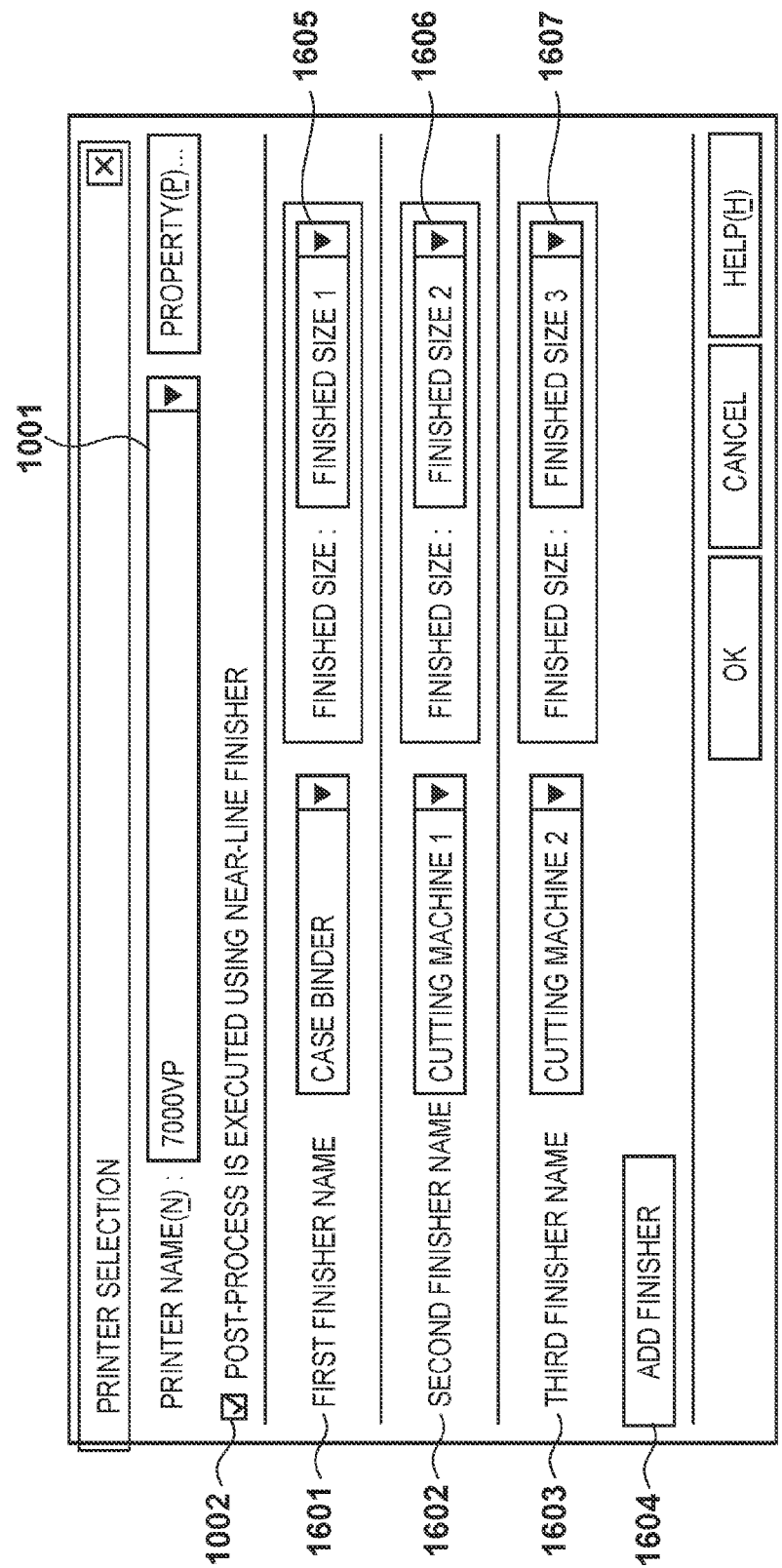
FIG. 16 is a view showing an example of a user interface window used to select a printer.

FIG. 16 shows an display example of a "printer selection" window prepared by extending FIG. 10. A first finisher name 1601, second finisher name 1602, and third finisher name 1603 are areas used to select near-line finishers used in post-processes after the print process. The user can increase the number of finishers that can be designated to an arbitrary number by clicking an "add finisher" button 1604. The example of FIG. 16 shows a state in which the user presses the "add finisher" button 1604 twice, and can designate up to the third finisher. That is, only the first finisher name 1601 is initially displayed. With this window, the bookbinding application 104 can accept, from the user, settings of a plurality of near-line finishers for post-processes with respect to one book file. The user can designate the first, second, and third finishers or more finishers in correspondence with types of post-processes. Each designated finisher is stored as a finishing attribute as a part of attribute information (that is, print setting information). When a plurality of near-line finishers are designated, the bookbinding application 104 issues instructions by transmitting a JDF which describes only a finishing instruction required for each finisher to that near-line finisher. Finished sizes 1605, 1606, and 1607 are areas used to designate finished sizes corresponding to the selected near-line finishers for post-processes. The bookbinding application 104 generates each JDF to be transmitted to the selected near-line finisher based on the finished size selected in this area.

Note that the user can select the same near-line finisher as the first to third finishers. When the user wants to separately execute post-processes several times step by step using the same finisher, he or she can select the same finisher a plurality of times. For example, this is the case when the user wants to execute cutting, thread stitching, and creasing using a single near-line finisher, but these processes cannot be executed at the same time due to the specifications of the finisher.

FIG. 19 is a view showing an example of the "JDF output" window shown in FIG. 14, which is extended to allow print processing by combining the printer and two or more near-line finishers in the bookbinding application 104. In FIG. 19, selection boxes 1901 to 1903 are areas used to designate near-line finishers used to execute finishing processes in a target print job, and are displayed when the check box 1404 is checked. Then, FIG. 19 allows the user to designate two or more near-line finishers for post-processes unlike in FIG. 14. FIG. 19 shows a display example when the "JDF output" window is opened after the user designates up to the third finisher on the "printer selection" window of FIG. 16. For this reason, FIG. 19 is displayed in a state in which the first to third finishers are set. Note that the user can change the type of finisher here using FIG. 19. Also, the user can designate three or more near-line finishers by pressing an "add finisher" button 1904. When a print execution instruction is issued by the OK button, the bookbinding application 104 starts JDF print processing which combines the designated printer and the plurality of near-line finishers in the sequence described using the flowchart shown in FIG. 15.

In order to execute JDF print processing that combines the printer and the plurality of near-line finishers, the user has to be allowed to make different finishing settings for the respective finishers. The bookbinding application 104 in the document processing system according to the embodiment of the present invention allows the user to set a plurality of "finished size attributes", "imposition types", "finishing attributes", and the like for a book file. Then, the bookbinding application 104 generates JDFs including different finishing instructions for the plurality of near-line finishers designated by the user on the "printer selection" window of FIG. 16 based on the attributes set for the book file, and transmits these JDFs to the finishers.

UIs of the bookbinding application 104 which allows the user to set a plurality of "finished size attributes", "imposition types", and "finishing attributes" for a book file will be described below with reference to FIGS. 17, 18A, and 18B.

Figure 17:
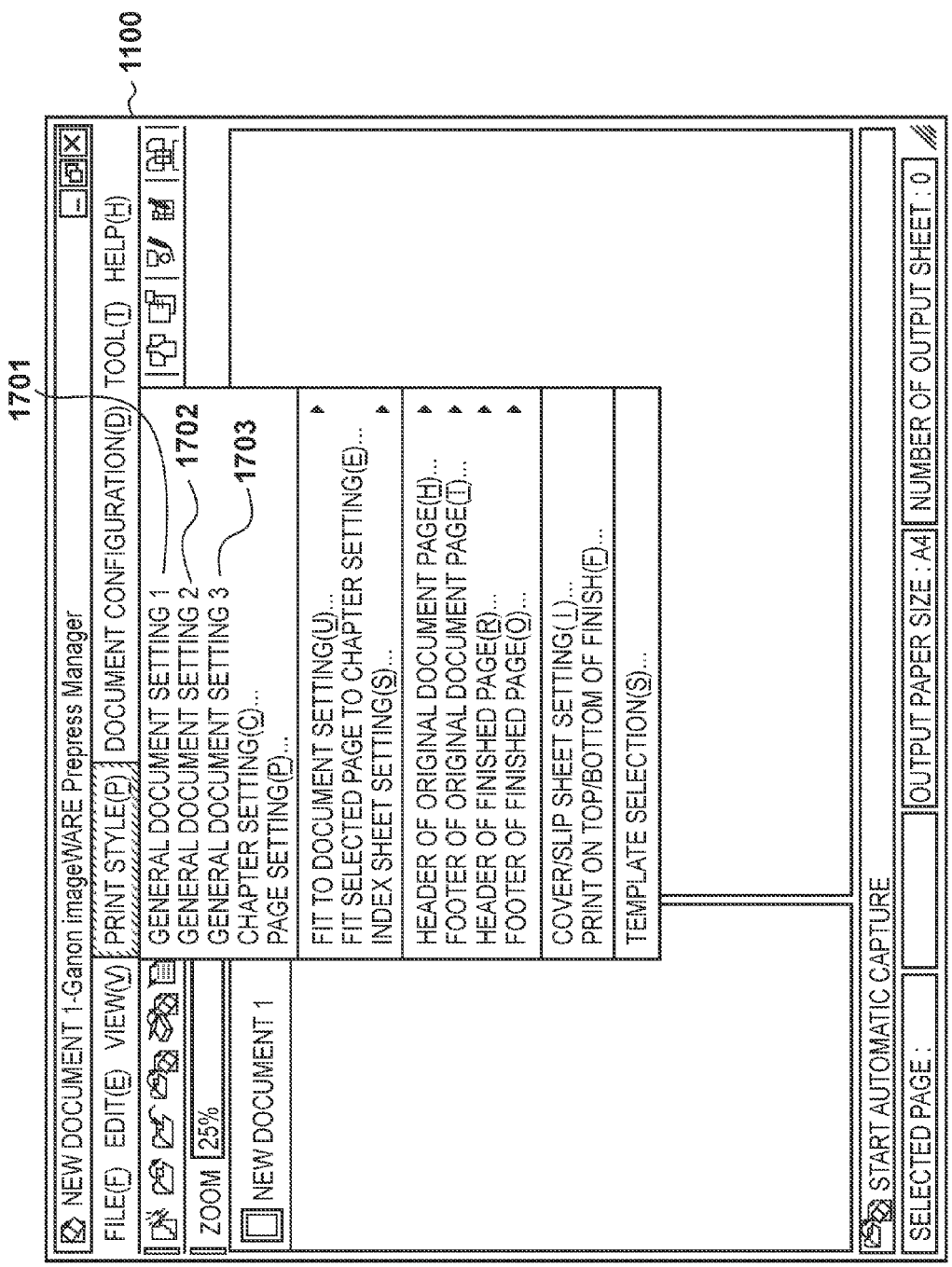
FIG. 17 is a view showing an example of a user interface window when a book file is opened.

FIG. 17 shows a window when the user designates the first to third finishers on the "printer selection" window of FIG. 16, and selects the "print style" menu on the window 1100.

When the user designates two or more near-line finishers on the "printer selection" window of FIG. 16, the bookbinding application 104 displays a plurality of choices used to open the "general document setting" window. More specifically, the choices as many as the number of designated finishers are displayed. Since the settings of the entire document for a post-process using the first near-line finisher can be made together with the print settings, independent settings of the entire document are required for the second and subsequent finishers. The example of FIG. 17 shows a case in which the three near-line finishers are designated. In addition to a "general document setting 1" button 1701, a "general document setting 2" button 1702 and "general document setting 3" button 1703 are newly displayed in a selectable state. Note that the settings of the entire document are print attributes corresponding to the book attributes, and when the user presses, for example, the "add finisher" button 1604 or 1904, initial book attributes for the added finisher are generated and stored. As initial settings of the added book attributes, the book attributes (that is, book attributes 1) initially set for that book file are copied. However, as for items unique to the added book attributes for a post-process, appropriate values are set. These book attributes are read out by a "general document setting" button (to be described later), and are displayed on a user interface window.

A window which allows the user to set the book attributes can be displayed from each of the "general document setting 1", "general document setting 2", and "general document setting 3" buttons. That is, the user can set different attribute values on each of "general document setting 1", "general document setting 2", and "general document setting 3" windows. As a result, the bookbinding application 104 can set a plurality of patterns of combinations of book attributes such as "finished size", "imposition type", and "finishing" for one book file (or one print job). Note that the bookbinding application 104 holds a plurality of book attributes described using FIGS. 2A and 2B in the book file (book attributes 1, 2, and 3).

Figure 18A:
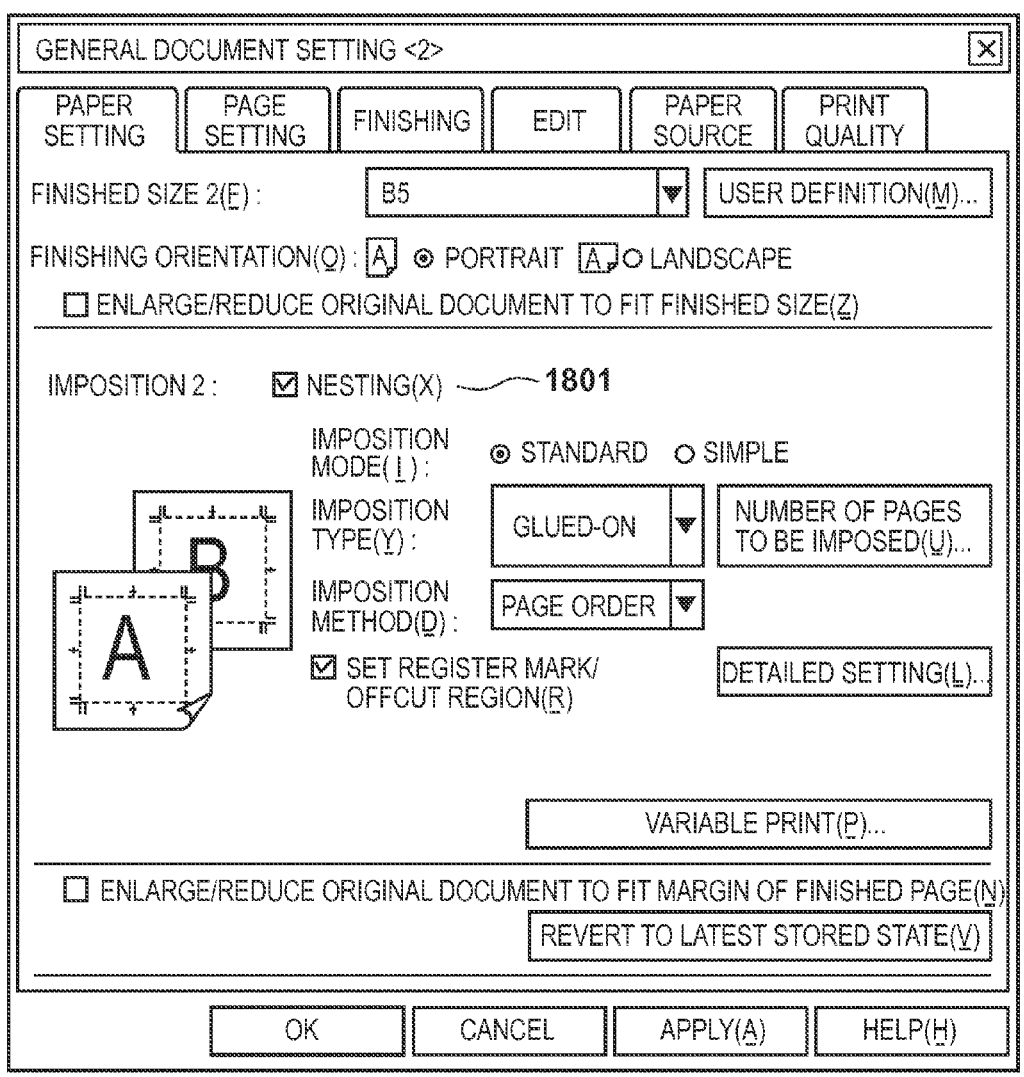
FIG. 18A is a view showing a user interface window used to set book attributes.

FIGS. 18A and 18B show a display example of the "general document setting 2" window when the user selects the "general document setting 2" button 1702 on the window 1100. Note that when the user selects the "general document setting 1" button 1701, the "general document setting 1" window is displayed. However, items which can be set on this window are the same as those on the windows shown in FIGS. 12A to 12C, and a description thereof will not be repeated.

On the "general document setting 2" window, values of book attributes (to be referred to as book attributes 2 hereinafter) related to a post-process (for example, "finished size attribute", "imposition type", "finishing attribute", and the like) can be set.

FIG. 18A shows an example of the display state of the paper setting sheet, and a "nesting" check box 1801 is newly settable unlike in the "general document setting 1" window. The "nesting" check box 1801 is used to set whether or not to execute nesting imposition, and is an item which is not included in the "general document setting 1" window, and is unique to settings of the entire document added for a post-process. The "nesting" check box 1801 is an item which can be set only when two or more different sizes are set for one book file as "finished size attributes". When the user checks the "nesting" check box, the bookbinding application 104 holds it as a "nesting attribute" of the book attributes 2 which are being set. Then, when the "nesting attribute" is ON, the bookbinding application 104 lays out finished pages of a finished size set in the same book attributes in finished pages of a next larger finished size of those set in other book attributes. This layout will be referred to as nesting imposition hereinafter. Note that the finished pages are defined as logical pages having the finished size. Details of the nesting imposition will be described later. The output paper size attribute can be set only on the "general document setting 1" window, and cannot be set on other "general document setting" windows. This is to set only one output paper size attribute for a book file. As for other attributes, the same book attributes as those on the "general document setting 1" window described using FIGS. 12A to 12C can be set.

FIG. 18B shows an example of a display state of the finishing sheet of the "general document setting 2" window. On this finishing sheet, the same items of book attributes as those on the finishing sheet of the "general document setting 1" window can be set. Also, on the "general document setting 2" window, attribute values different from those on the "general document setting 1" window can be set. Of course, the same attribute values can also be set. For example, when output sheets are trimmed separately in two stages using cutting machine A, "automatically trim to fit finished size" can be set as a finishing attribute on the finishing sheets of both the "general document setting 1" and "general document setting 2" windows.

When the user changes settings from those using two or more near-line finishers to those using only one finisher, buttons other than the "general document setting 1" button (that is, "general document setting 2" and subsequent buttons) cannot be set on the window 1100. Thus, values other than the book attributes 1 (those set for the book attributes 2 and subsequent book attributes) are invalid as a book file. For this reason, when the settings of final products (those related to a minimum finished size) are set in book attributes other than the book attributes 1, the user has to set these setting values as the book attributes 1 again. Hence, when the settings are changed from those using two or more near-line finishers to those using only one finisher on the "printer selection" window of FIG. 16, the bookbinding application 104 controls to leave the book attribute values as final products in the book file. For example, when the settings are changed from those using two or more near-line finishers to those using only one finisher on the "printer selection" window of FIG. 16, the bookbinding application 104 searches for book attributes X including a minimum "finished size" in the book file. Then, the bookbinding application 104 determines that the attribute values of the found book attributes X are those for final products, leaves them as only one set of book attributes of the book file, and invalidates other book attributes. In this manner, when the user changes the number of near-line finishers from two or more to one, he or she need not make settings of final products on the "general document setting" window again.

When the user presses the OK button, the bookbinding application 104 closes the "general document setting" window shown in FIGS. 18A and 18B, and checks consistency of the setting contents at this time. The bookbinding application 104 checks whether or not the book file includes nest settings. Then, when specific book attributes include nest settings, the bookbinding application 104 checks whether or not a finished size larger than that of the specific book attributes is included in other book attributes. If such finished page is not included, the bookbinding application 104 determines that there is no finished pages that allow nesting, displays a message shown in FIG. 20A, and changes the "nesting" setting value of the specific book attributes to OFF.

Note that when the book file is set with two or more "finished size attributes", the bookbinding application 104 displays these finished sizes as setting items which can be selected by the size selection boxes 1605, 1606, and 1607 in FIG. 16. The user selects desired finished sizes using the finished size selection boxes 1605, 1606, and 1607, thus assigning them as sizes of products of the respective near-line finishers for post-processes. The bookbinding application 104 acquires book attributes including the finished size which is set by the user and corresponds to the near-line finisher, and generates a JDF as an instruction to that near-line finisher and rendering data to be output to the printer. At this time, in FIG. 16, the bookbinding application 104 generates JDFs in turn from the near-line finisher to which a largest finished size is assigned by the user, and sequentially transmits them to the near-line finishers. As a result, when the same near-line finisher is designated a plurality of times in FIG. 16, a post-processes to be executed later can be prevented from being executed earlier. That is, when a JDF including an instruction of a post-process to be executed later is transmitted to the near-line finisher 108 before that including an instruction of a post-process to be executed earlier, the post-process to be executed later may be executed earlier. By controlling the JDF transmission order, this problem can be prevented. Furthermore, in order to prevent the user from mistaking an order of post-processes using the near-line finishers, the bookbinding application 104 displays a guidance shown in FIG. 20B when print processing is executed on the "JDF output" window of FIG. 19. As shown in FIG. 20B, the bookbinding application 104 displays the names of the near-line finishers in an order of post-processes to be executed (that is, an order of JDFs to be transmitted). Thus, the user can confirm the order of post-processes on this dialog before he or she carries print results output from the printer to the near-line finisher, and can be prevented from mistaking an order of post-processes. Note that when the near-line finisher accepts an execution instruction of a job ticket, it may determine a job to be executed earlier, and if such job is not found, the near-line finisher may execute processing based on the job ticket. In this manner, an order error upon execution of a plurality of post-processes step by step in one finisher can be prevented.

<Nesting Imposition>

As described above, when the "nesting" check box 1801 is checked, the bookbinding application 104 executes nesting imposition to lay out (allocate), in one finished page, finished pages smaller than that page.

Figure 21:
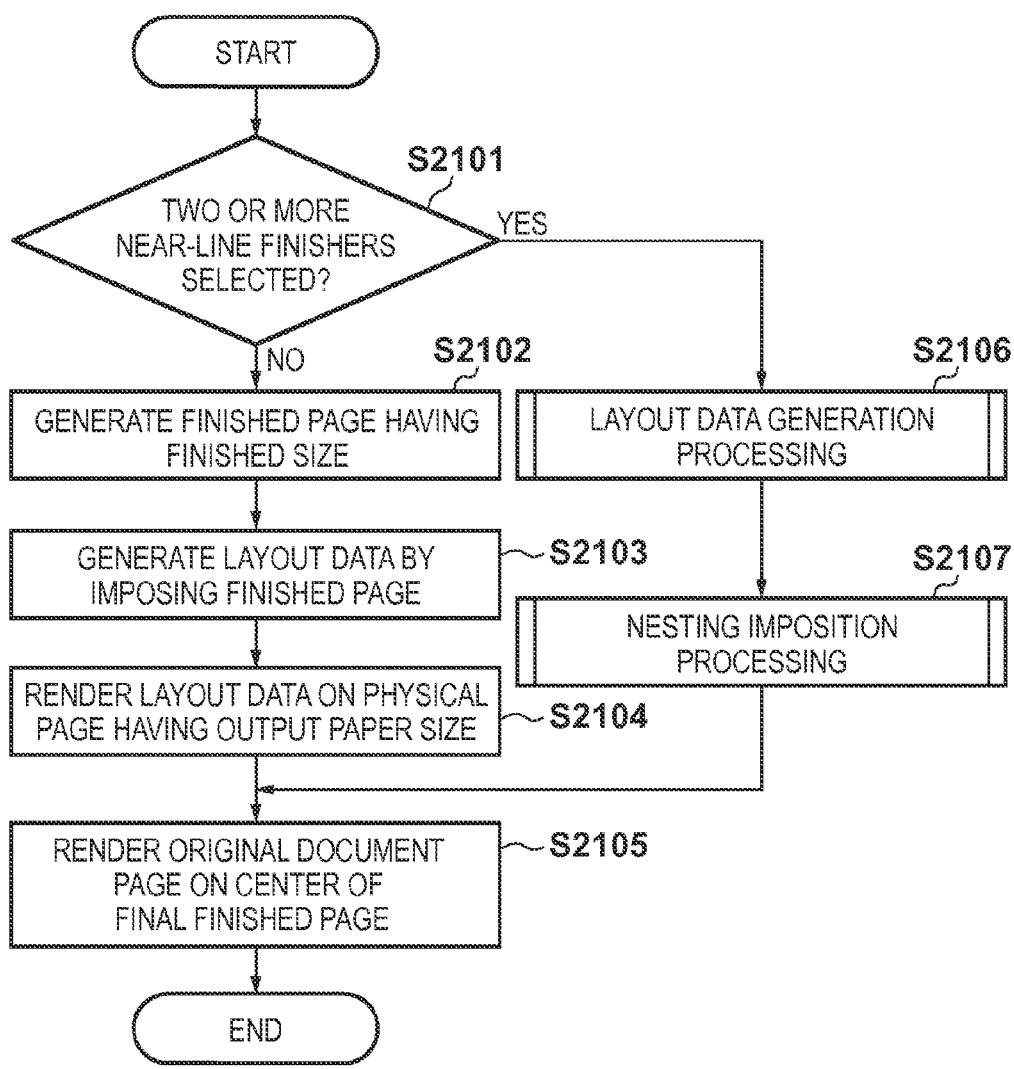
FIG. 21 is a flowchart for explaining the sequence of imposition processing.

The nesting imposition processing in the bookbinding application 104 will be described below with reference to FIG. 21. FIG. 21 is a flowchart for explaining the nesting imposition processing sequence. The sequence shown in FIG. 21 indicates the generation sequence of rendering data for a preview, which is executed in, for example, step S703 of FIG. 4. A book file has a format shown in, for example, FIGS. 2A and 2B, and values of items of attributes of respective nodes, that is, respective levels are described using tags. Since the sequence of FIG. 21 is a part of the processing of the bookbinding application 104, it is executed by the computer 100 (more specifically, its processor).

The bookbinding application 104 judges in step S2101 whether or not two or more near-line finishers are selected for one book file. If two or more near-line finishers are not selected, the bookbinding application 104 acquires a finished size attribute from the book attributes (in this case, since the book file includes only one set of book attributes, only one size attribute value is included), and generates finished pages having the finished size (step S2102). Next, the bookbinding application 104 acquires an "imposition type" attribute from the book attributes, and lays out (imposes) the finished pages generated in step S2102 based on the acquired "imposition type" attribute, thus generating rendering data (to be referred to as layout data hereinafter) (step S2103). In step S2104, the bookbinding application 104 acquires an "output paper size" attribute from the book attributes, and renders the layout data generated in step S2103 on a physical page having the output paper size. On the other hand, if the bookbinding application 104 judges in step S2101 that two or more near-line finishers are selected, the process advances to step S2106 to execute "layout data generation processing) corresponding to the case in which the two or more near-line finishers are selected. Then, the process advances to step S2107 to execute "nesting imposition processing". After that, the process advances to step S2105. Finally, in step S2105, the bookbinding application 104 renders original document page data at the center of each finished page, thus ending the processing. As described above, when the nest setting is made, the bookbinding application 104 lays out a page having a smaller finished size in a page having a larger finished size in turn in a nested manner.

Details of the "layout data generation processing" in step S2106 and those of the "nesting imposition processing" in step S2107 will be described below.

<Layout Data Generation Processing Sequence>

Figure 22:
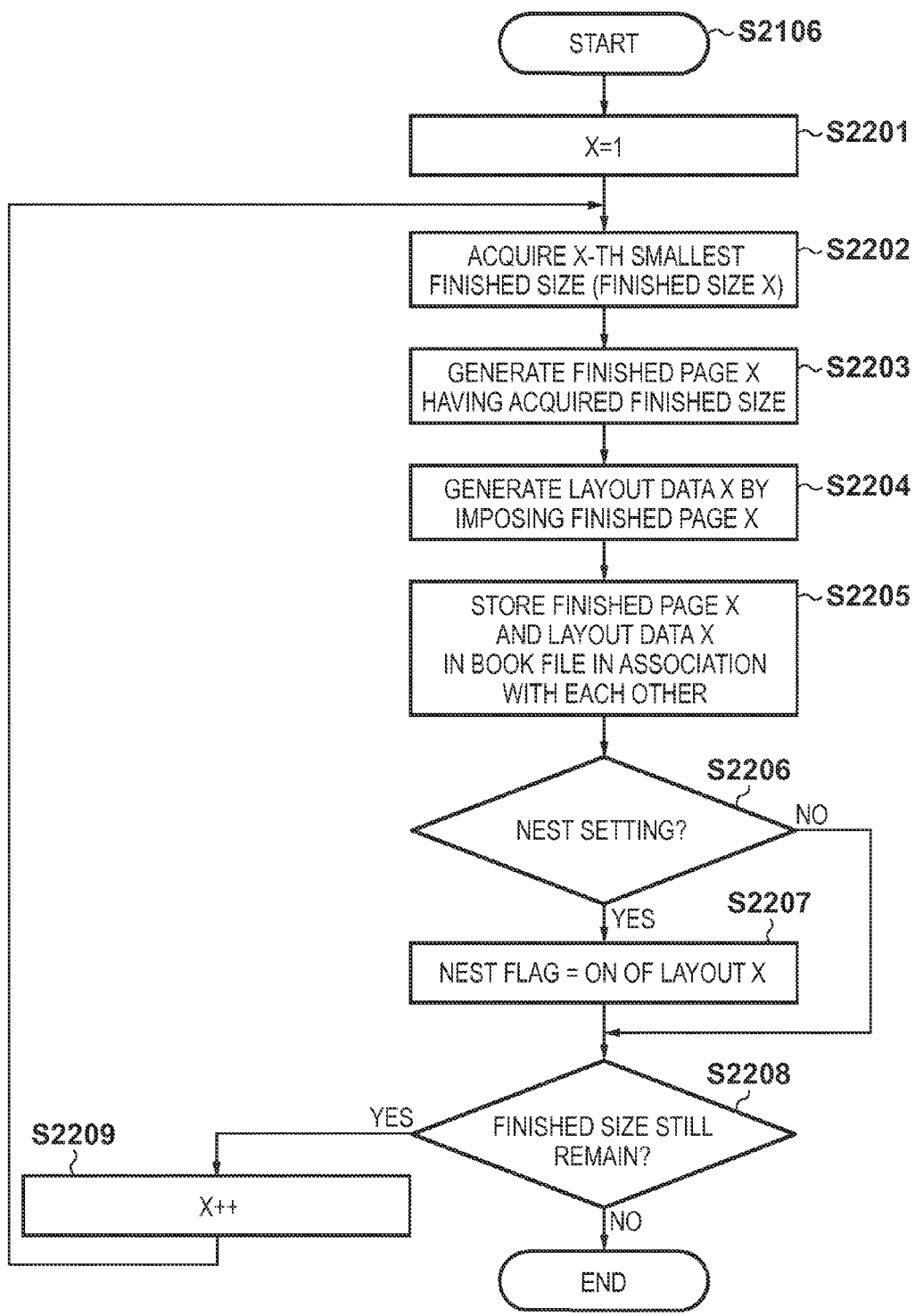
FIG. 22 is a flowchart for explaining the sequence of layout data generation processing.

FIG. 22 is a flowchart for explaining the processing sequence of the "layout data generation processing" in step S2106.

The bookbinding application 104 initializes a variable X to 1 in step S2201 (note that X-th book attributes included in a book file will be referred to as book attributes X, and a finished size attribute value included in the book attributes X will be referred to as a finished size X). In step S2202, the bookbinding application 104 searches a plurality of sets of book attributes (book attributes 1, 2, 3, . . . ) held in the book file for book attributes (book attributes X) including an X-th smallest (smallest) finished size attribute value. The bookbinding application 104 acquires the finished size attribute included in the found book attributes (the finished size included in the book attributes X is defined as the finished size X.) Then, the bookbinding application 104 generates finished pages X having the acquired finished size X (step S2203). Next, the bookbinding application 104 acquires an "imposition type" attribute from the book attributes X, and generates layout data X by laying out the finished page X generated in step S2202 based on the acquired "imposition type" attribute (step S2204). In step S2205, the bookbinding application 104 stores the finished pages X and layout data X in the book file in association with each other. The layout data X is data which describes, for example, a position, size, direction, and the like on a physical page on which the pages X are laid out. The bookbinding application 104 judges whether or not the book attributes X acquired in step S2201 include a "nesting" setting (step S2206). If the "nesting" setting is included, the bookbinding application 104 sets a nesting flag of the layout data X to be ON (step S2207), and the process advances to step S2208. If the "nesting" setting is not included, the process directly advances to step S2208. Then, the bookbinding application 104 judges in step S2208 whether or not the book file includes another finished size attribute. If another finished size attribute is included, the bookbinding application 104 counts up the variable X by 1 in step S2209, and the process then returns to step S2202. Then, in step S2202, the bookbinding application 104 acquires book attributes including an X-th smallest, that is, smallest finished size of the remaining finished sizes. The bookbinding application 104 repeats this processing until no finished size included in the book file is found. The bookbinding application stores all finished sizes (finished sizes 1, 2, 3, . . . ) included in the book file and layout data obtained by imposing finished pages generated based on the respective finished sizes (layout data 1, 2, 3, . . . ) in the book file in ascending order of finished size in association with each other. Note that the finished sizes 1, 2, 3, . . . may often be referred to as a first finished size, second finished size, third finished size, . . . .

<Detailed Nesting Imposition Processing Sequence>

Details of the nesting imposition processing in step S2107 of FIG. 21 will be described below with reference to the flowchart shown in FIG. 23. Note that in this processing as well, X-th book attributes included in a book file will be referred to as book attributes X, a finished size attribute value included in the book attributes X will be referred to as a finished size X, and layout data stored in association with the finished size X will be referred to as layout data X.

The bookbinding application 104 initializes variables i and X to 1 in step S2301. In step S2302, the bookbinding application 104 acquires layout data X generated in step S2106, and temporarily stores the acquires layout data X as layout data Y (step S2303). Note that since the layout data X is managed in association with a finished size X, and X=1 in this case, this layout data means layout data 1 obtained by laying out the smallest finished size in the book file. Subsequently, the bookbinding application 104 judges whether or not the nesting flag of the layout data X is ON (step S2304). If the nesting flag is ON, the process advances to step S2305 to acquire layout data (X+i). In step S2306, the bookbinding application 104 renders the layout data Y at the center of a finished page (X+i) laid out on the layout data (X+i) (note that a plurality of finished pages are often laid out on layout data. In this case, the bookbinding application 104 renders the layout data Y on all finished pages (X+i) in step S2306). Then, the bookbinding application 104 stores the data after rendering as layout data Y by overwriting (step S2307). The bookbinding application 104 judges whether or not another layout data to be nested is stored (that is, whether or not the nesting flag of the layout data (X+i) is OFF) (step S2308). If another layout data to be nested is stored, the bookbinding application 104 counts up the variable i by 1 (step S2316), and the process returns to step S2305. The bookbinding application 104 repeats this processing until no layout data to be nested is stored. If no layout data to be nested is stored, the process advances to step S2309, and the bookbinding application 104 changes the value of the variable X to X+i+1. On the other hand, if the nesting flag is OFF in step S2304, the bookbinding application 104 acquires layout data (X+1). Then, the process advances to step S2313, and the bookbinding application 104 temporarily stores rendering data obtained by rendering the layout data Y and layout data (X+1) side by side as layout data Y (step S2314). The bookbinding application 104 counts up the variable X by (step S2317), and the process advances to step S2310. Note that when the layout data Y and layout data (X+i) are laid out side by side in step S2313, if they fall outside one physical page, the bookbinding application 104 generates a new physical page and renders the layout data (X+i).

The bookbinding application 104 judges in step S2310 whether or not another layout data X is stored. If another layout data is stored, the process advances to step S2311 to execute processing for acquiring the layout data X. Then, the process returns to that from step S2304. The bookbinding application 104 repeats this processing until no layout data X is stored (that is, for all layout data 1, 2, 3, . . . held by the book file). Finally, layout data Y which imposes other finished pages to be nested in respective finished pages in turn for all the finished pages (finished pages 1, 2, 3, . . . ) included in the book file is finally obtained. Then, if the bookbinding application 104 judges in step S2310 that no layout data X is stored, it generates physical pages having an output paper size in step S2315, and renders the obtained layout data Y on these pages, thus ending the processing.

<Imposition Finish Example>

Figure 23:
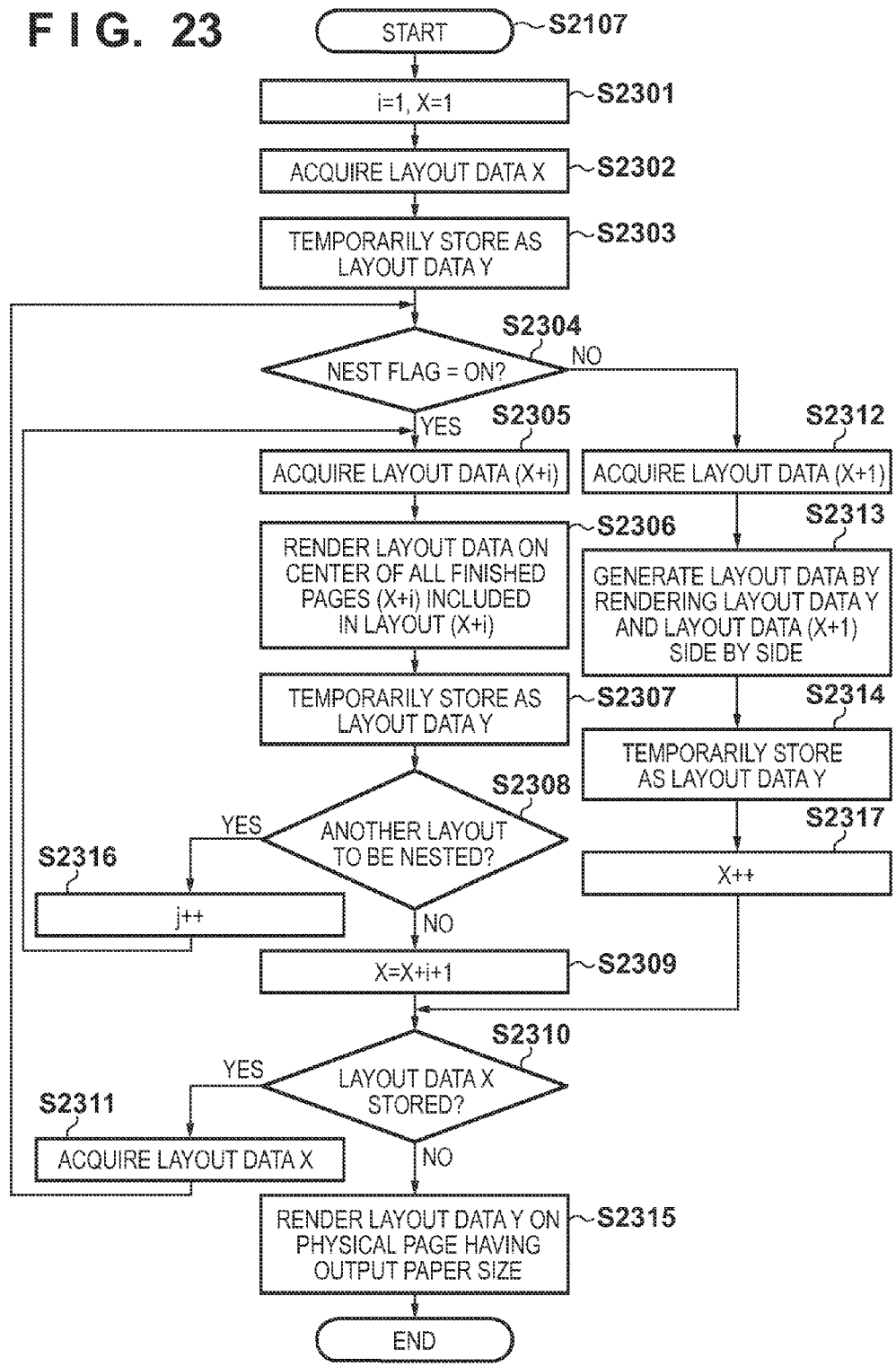
FIG. 23 is a flowchart for explaining the sequence of nesting imposition processing.

FIGS. 24A to 24L are views showing examples of layout results generated by the bookbinding application 104 by the "nesting imposition processing" in step S2107 described using the flowchart shown in FIG. 23. Note that since the examples of FIGS. 24A to 24L assume that a register mark addition setting is made on the "register mark setting" window of FIG. 13B, register marks indicating trimming positions are also rendered at positions of finished pages.

Figure 24A:
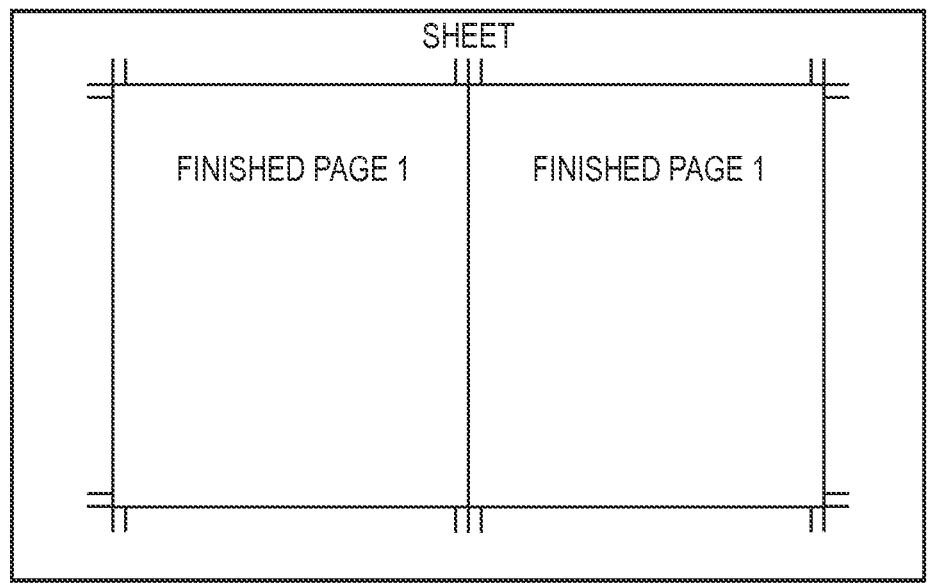
FIG. 24A is a view showing an example of the result of the layout data generation processing.

FIG. 24A shows an example in which the book file includes only one finished page, and attribute values of book attributes are [output paper size (SRA3, landscape), finished size (A4, portrait), and imposition type (leaf (vertical 1×horizontal 2))].

Figure 24B:
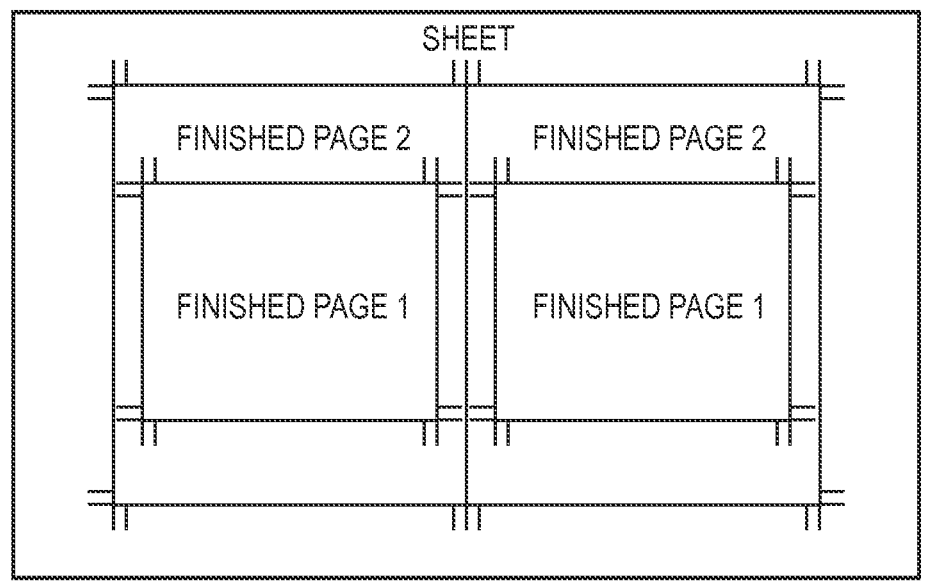
FIG. 24B is a view showing an example of the result of the layout data generation processing.

FIG. 24B shows an example when book attributes include a nest setting. In this example, a book file includes two finished sizes (that is, two near-line finishers are selected, and the book file includes two sets of book attributes). Attribute values of book attributes 1 are [output paper size (SRA3, landscape), finished size (B5, landscape), imposition type (leaf (vertical 1×horizontal 1)), and nest setting (ON)]. Attribute values of book attributes 2 are [finished size (A4, portrait), imposition type (leaf (vertical 1×horizontal 1)), and nest setting (OFF)].

Figure 24C:
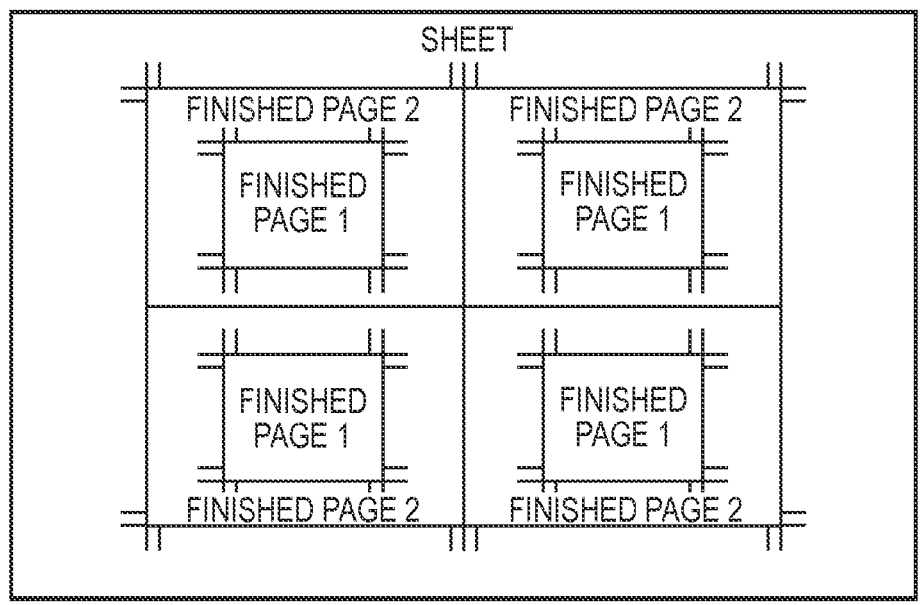
FIG. 24C is a view showing an example of the result of the layout data generation processing.

FIG. 24C shows an example when book attributes include a nest setting. In this example, a book file includes two finished sizes. Attribute values of book attributes 1 are [output paper size (B3, landscape), finished size (B6, landscape), imposition type (leaf (vertical 1×horizontal 1)), and nest setting (ON)]. Attribute values of book attributes 2 are [finished size (A5, landscape), imposition type (leaf (vertical 2×horizontal 2)), and nest setting (OFF)].

Figure 24D:
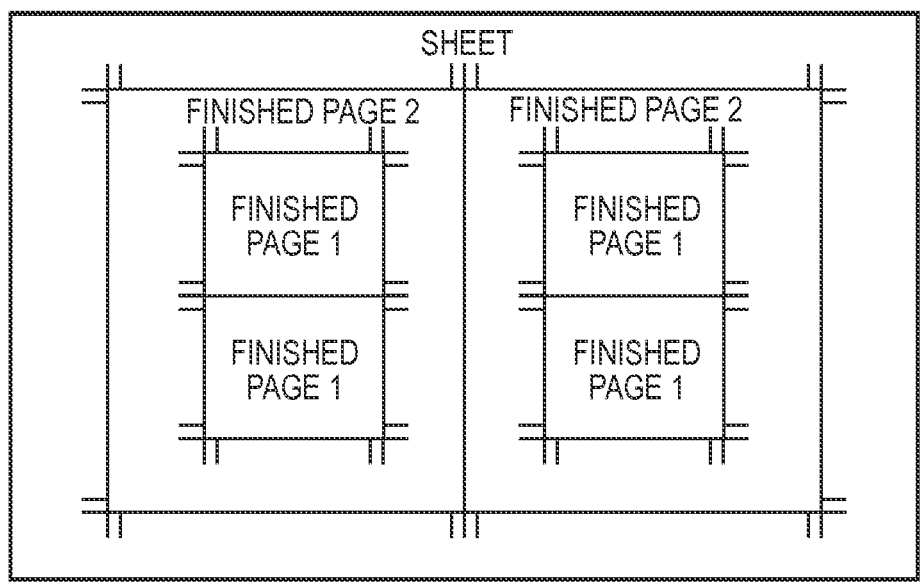
FIG. 24D is a view showing an example of the result of the layout data generation processing.

FIG. 24D shows an example when book attributes include a nest setting. In this example, a book file includes two finished sizes. Attribute values of book attributes 1 are [output paper size (SRA3, landscape), finished size (B6, landscape), imposition type (leaf (vertical 2×horizontal 1)), and nest setting (ON)]. Attribute values of book attributes 2 are [finished size (A4, portrait), imposition type (leaf (vertical 1×horizontal 2)), and nest setting (OFF)].

FIG. 24E shows an example when book attributes include a nest setting. In this example, a book file includes three finished sizes. Attribute values of book attributes 1 are [output paper size (B3, landscape), finished size (B6, landscape), imposition type (leaf (vertical 2×horizontal 1)), and nest setting (ON)]. Attribute values of book attributes 2 are [finished size (A4, portrait), imposition type (leaf (vertical 1×horizontal 2)), and nest setting (ON)]. Attribute values of book attributes 3 are [finished size (A3, landscape), imposition type (leaf (vertical 1×horizontal 1)), and nest setting (OFF)].

FIG. 24F shows an example when a nest setting is not made. In this example, a book file includes two finished sizes. Attribute values of book attributes 1 are [output paper size (SRA3, landscape), finished size (B5, landscape), imposition type (leaf (vertical 1×horizontal 1)), and nest setting (OFF)]. Attribute values of book attributes 2 are [finished size (A4, portrait), imposition type (leaf (vertical 1×horizontal 1)), and nest setting (OFF)].

Figure 24G:
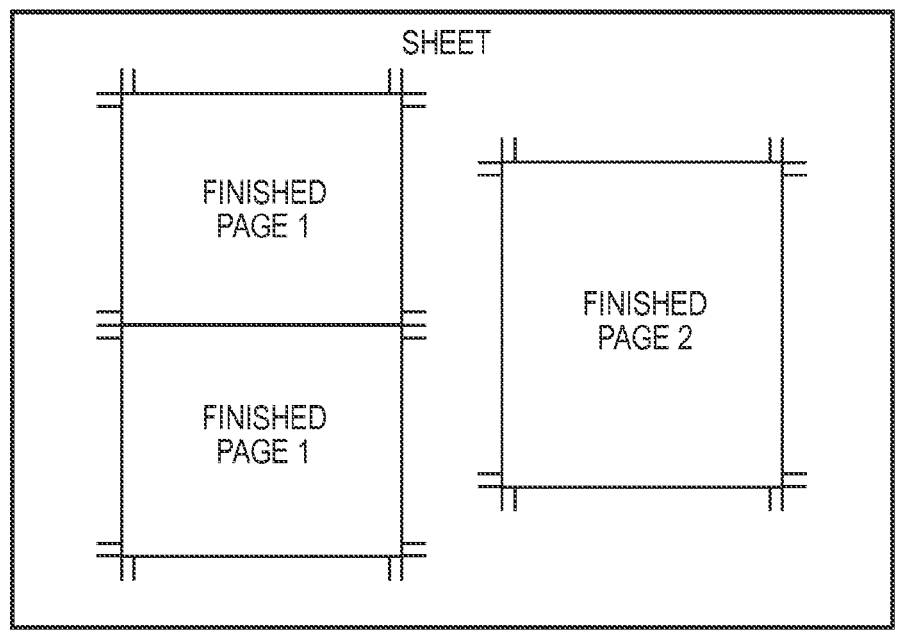
FIG. 24G is a view showing an example of the result of the layout data generation processing.

FIG. 24G shows an example when a nest setting is not made. In this example, a book file includes two finished sizes. Attribute values of book attributes 1 are [output paper size (SRA3, landscape), finished size (B5, landscape), imposition type (leaf (vertical 2×horizontal 1)), and nest setting (OFF)]. Attribute values of book attributes 2 are [finished size (A4, portrait), imposition type (leaf (vertical 1×horizontal 1)), and nest setting (OFF)].

Figure 24H:
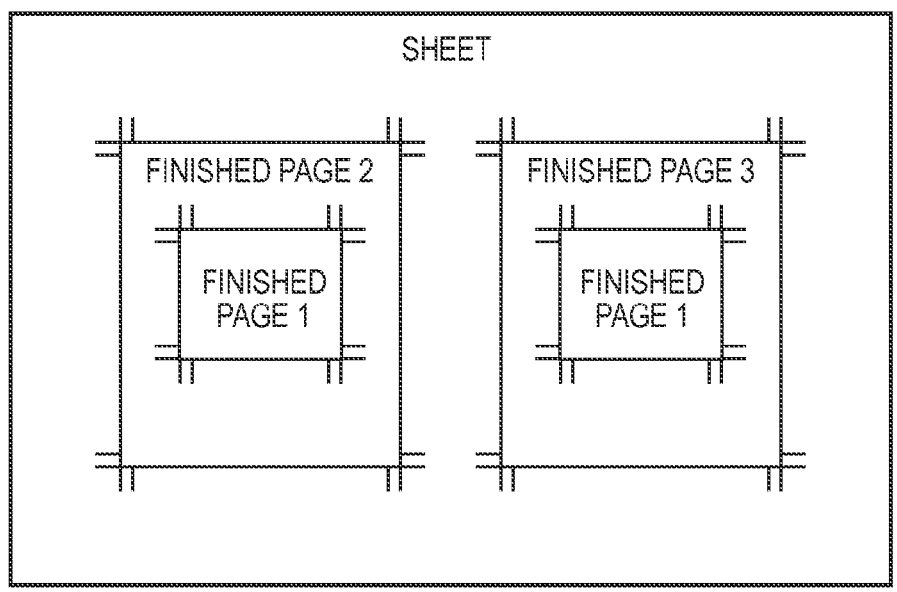
FIG. 24H is a view showing an example of the result of the layout data generation processing.

FIG. 24H shows an example when book attributes include a nest setting, and include different finished sizes of the same size. In this example, a book file includes three finished sizes. Attribute values of book attributes 1 are [output paper size (SRA3, landscape), finished size (B5, landscape), imposition type (leaf (vertical 1×horizontal 1)), and nest setting (ON)]. Attribute values of book attributes 2 are [finished size (A4, portrait), imposition type (leaf (vertical 1×horizontal 1)), and nest setting (OFF)]. Attribute values of book attributes 3 are [finished size (A4, portrait), imposition type (leaf (vertical 1×horizontal 1)), and nest setting (OFF)]. In this case, two different finished pages (which have the same size but their book attributes are different) are laid out on a single sheet, and there are two finished pages which can nest finished pages 1. For this reason, as can be seen from FIG. 24H, finished pages 1 are laid out to be nested in both finished pages 2 and 3. Note that when there are two or more finished pages that allow nesting on a single sheet, the bookbinding application 104 has a function of selecting a finished page to be nested.

FIG. 24K shows a setting UI which allows to select whether or not to nest each finished page in the bookbinding application 104. The user selects a finished page that he or she does not want to nest, and right-clicks that page, thus displaying a menu "this finished page is not nested" 2401. FIG. 24K shows a state in which the user selects finished page 3, and right-clicks this page. When the user executes "this finished page is not nested", finished page 1 is laid out to be nested in only each finished page 2, as shown in FIG. 24L.

<Imposition for Case Binding>

When "casing-in" is selected as an imposition type on the paper setting sheet on the window of FIG. 18A, the bookbinding application 104 displays the finishing sheet in a state shown in FIG. 18B. When the user designates "paper size of glued-on cover" on the window of FIG. 18B, the bookbinding application generates a physical page for a glued-on cover in addition to those which have already been displayed on the UI window 1100. Note that when "casing-in" is selected as an imposition type, if two or more near-line finishers are designated, the user can make a nest setting.

FIG. 24I shows an example when a book file includes two finished size. Furthermore, in this example, attribute values of book attributes 1 are [output paper size (A4, portrait), glued-on cover paper size (SRA3, landscape), finished size (B6, landscape), imposition type (case binding), and nest setting (ON)]. Attribute values of book attributes 2 are [finished size (A5, landscape), imposition type (vertical 2×horizontal 1), and nest setting (OFF)]. At this time, the bookbinding application 104 applies the nesting imposition processing described using FIGS. 21 to 23 to both of a glued-on cover (Cover) (left side in FIG. 24I) and body text (Body) (right side in FIG. 24I). At this time, in step S2105 of FIG. 21, the bookbinding application renders the same original document page data (that for the glued-on cover, and only one data is included in the book file) on all finished pages laid out on the glued-on cover physical page. On the other hand, the bookbinding application sequentially renders different original document page data (those for body text, and a plurality of data are included in the book file) on finished pages laid out on body text finished pages.

The example of FIG. 24I shows the case in which the glued-on cover and body text are imposed based on the same "imposition type" attribute. However, the bookbinding application 104 can set different "imposition type" attributes for the glued-on cover and body text.

Figure 24J:
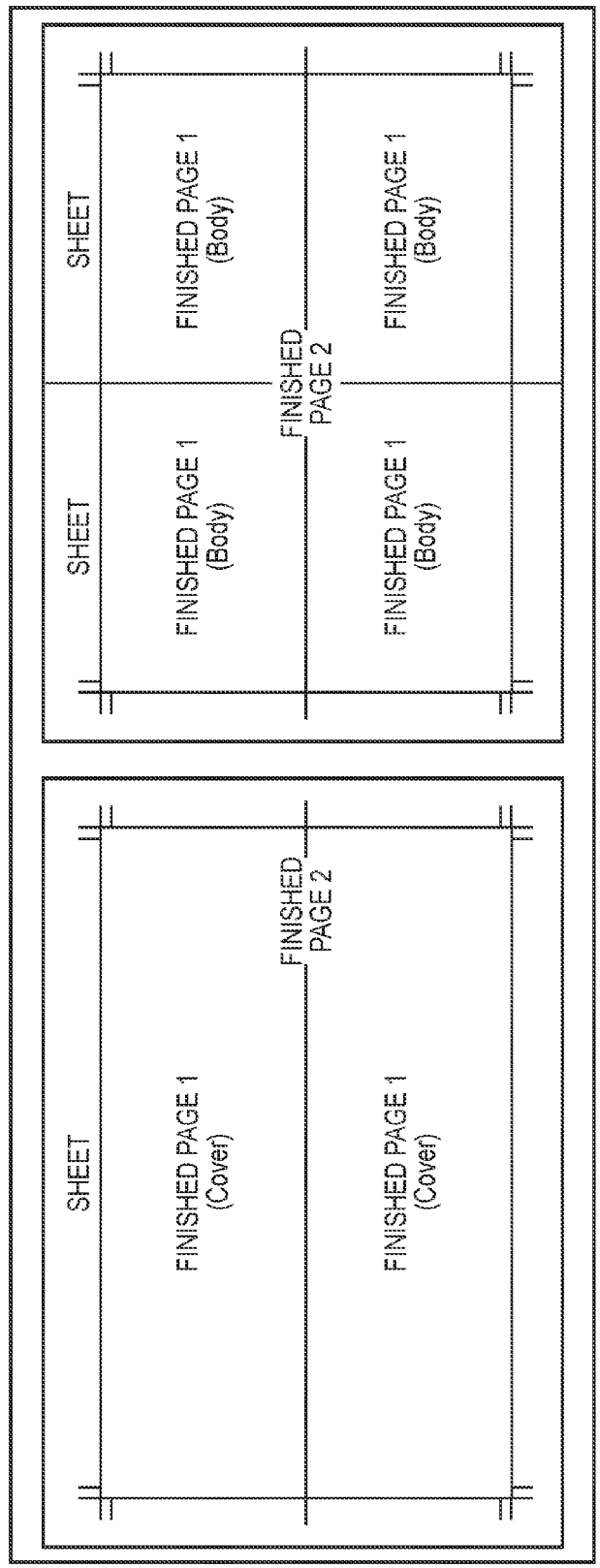
FIG. 24J is a view showing an example of the result of the layout data generation processing.
Figure 24L:
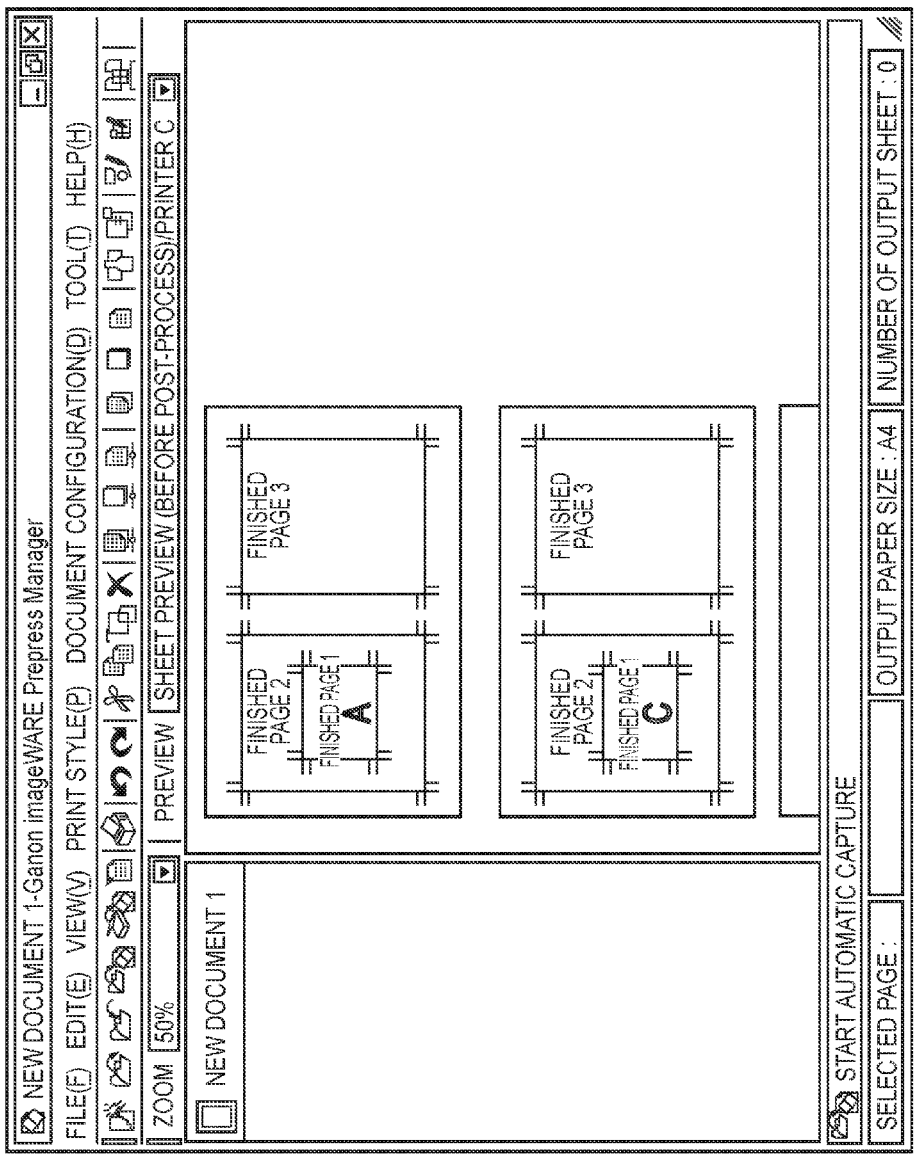
FIG. 24L is a view showing an example of the result of the layout data generation processing.

FIG. 24J shows an example when different imposition types are set for a glued-on cover and body text. In this example, attribute values of book attributes 1 are [output paper size (SRA3, landscape), glued-on cover paper size (SRA3, landscape), finished size (B6, landscape), imposition type (case binding), and nest setting (ON)]. Attribute values of book attributes 2 are [finished size (A5, landscape), imposition type (vertical 2×horizontal 1), glued-on cover imposition type (vertical 2×horizontal 1), and nest setting (OFF)]. The left side of FIG. 24J indicates a cover, and the right side of FIG. 24J indicates body text.

<Step-by-Step Preview Display of Product of Near-Line Finisher>

When two or more near-line finishers are set, the bookbinding application 104 identifiably preview-displays a state before post-processes by the near-line finishers and those after the post-processes by the near-line finishers on the UI window 1100.

FIGS. 25A to 25D are views showing identifiable display examples of a state of products immediately after they are output from the printer (before post-processes) and those of products by the respective near-line finishers when the setting described with reference to FIG. 24B is performed for the book file.

Figure 25A:
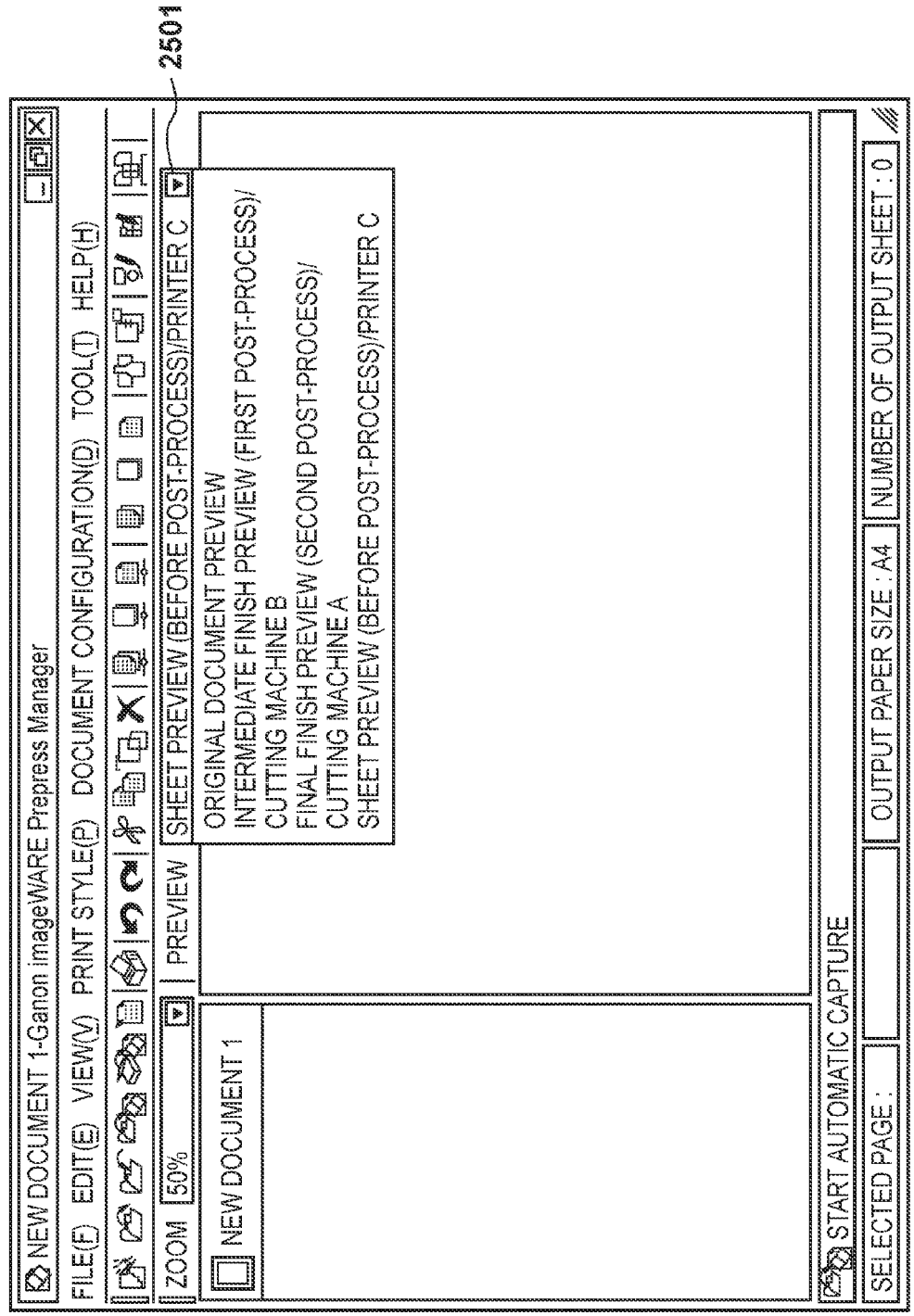
FIG. 25A is a view showing a preview display example.

FIG. 25A shows a state in which the user selects a "preview" combo box 2501 on the UI window 1100. The user can select a preview mode from "original document preview", "sheet preview (before post-process)", "intermediate finish preview (X-th post-process)", and "final finish preview (X-th post-process)".

Figure 25B:
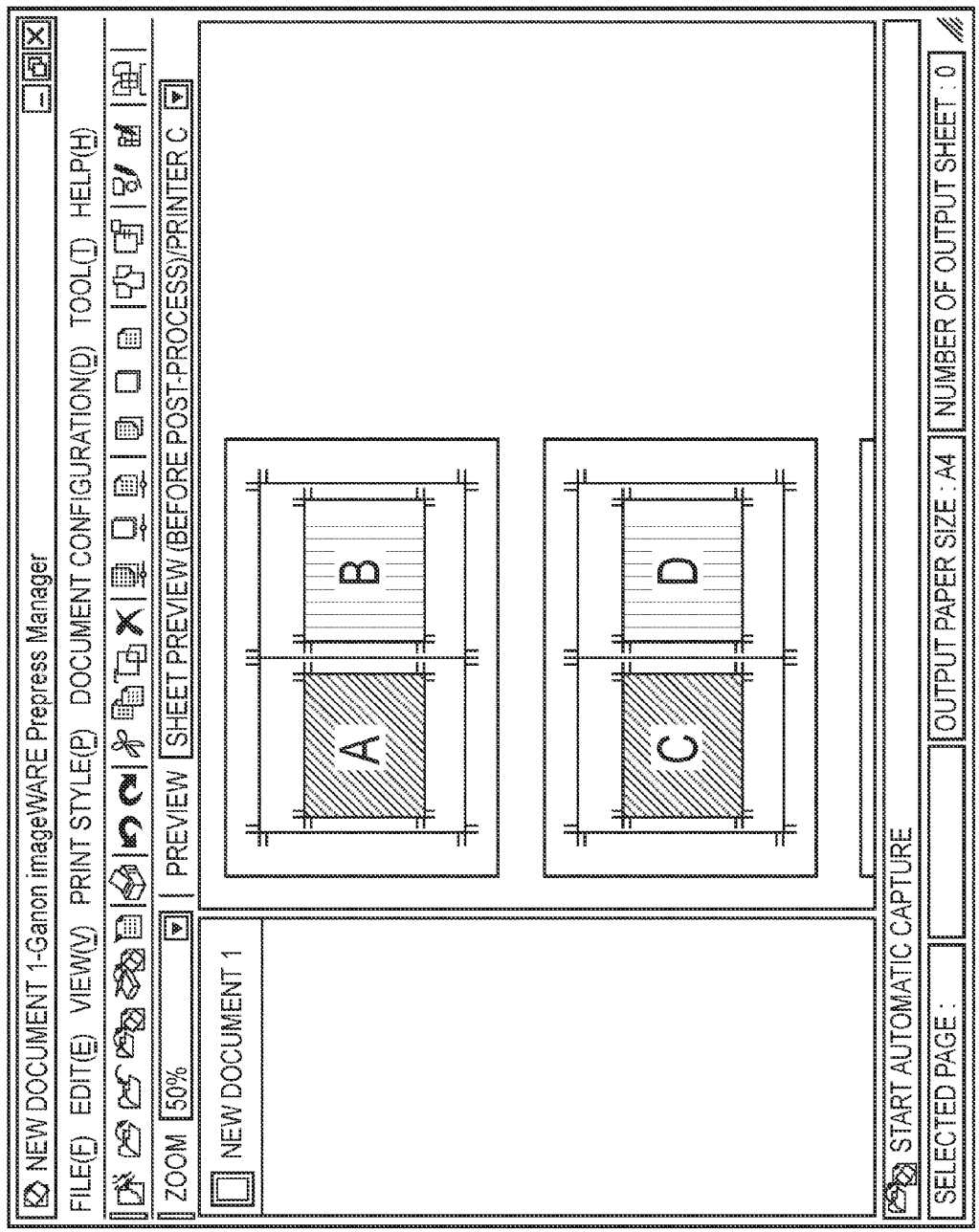
FIG. 25B is a view showing a preview display example.

"Sheet preview (before post-process)" is a preview mode for displaying a state immediately after sheets are printed by the printer (before post-processes using finishers). FIG. 25B shows a display example upon selection of "sheet preview (before post-process)". As can be seen from FIG. 25B, the bookbinding application 104 displays a state immediately after sheets are output from the printer (before post-processes).

Figure 25C:
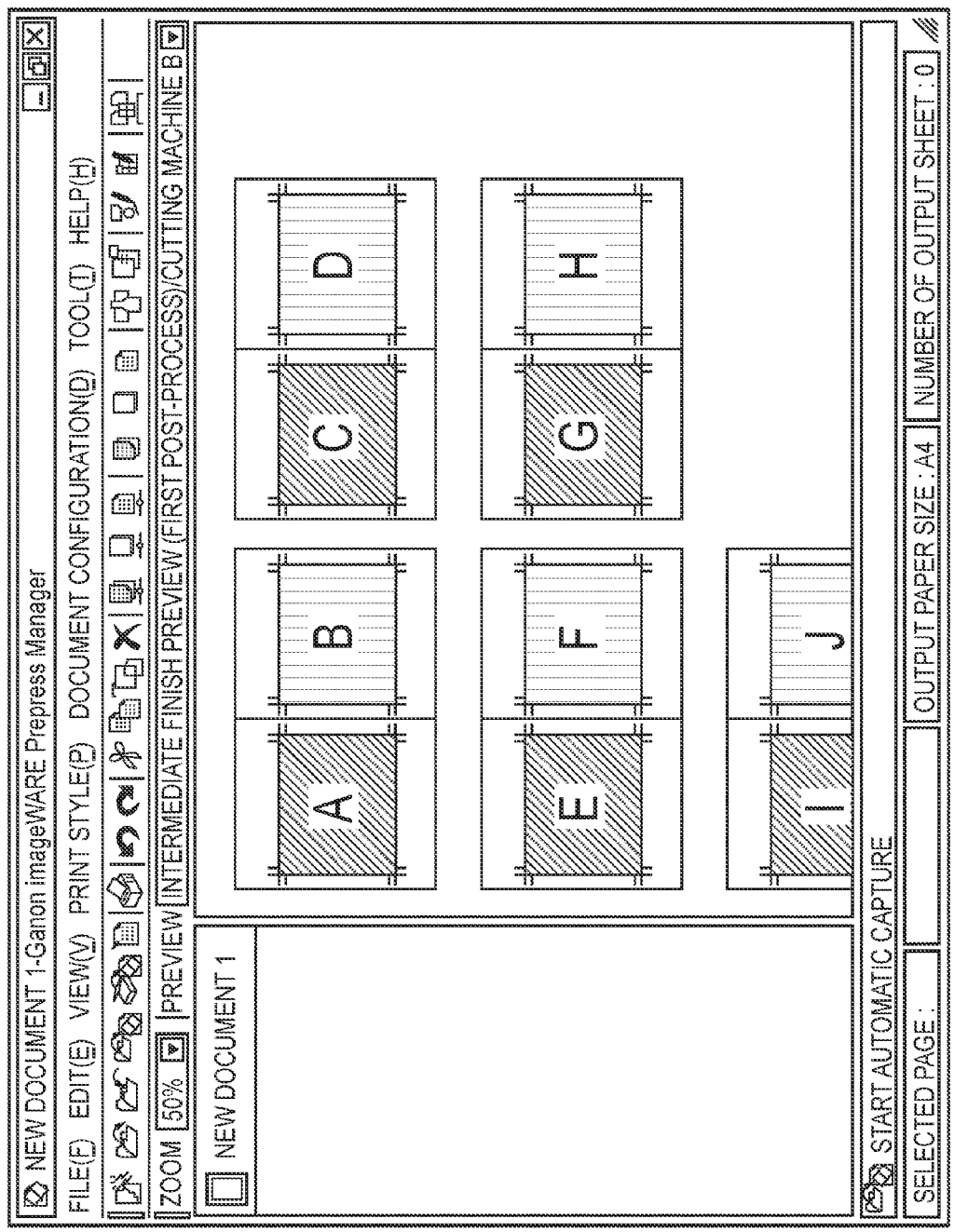
FIG. 25C is a view showing a preview display example.

"Intermediate finish preview (X-th post-process)" is a preview mode which is selectable only when two or more near-line finishers are set, and displays intermediate products after the post-process of the near-line finisher. FIG. 25C shows a display example upon selection of "intermediate finish preview (X-th post-process)". This example shows a state after first trimming at positions of finished pages 2.

Figure 25D:
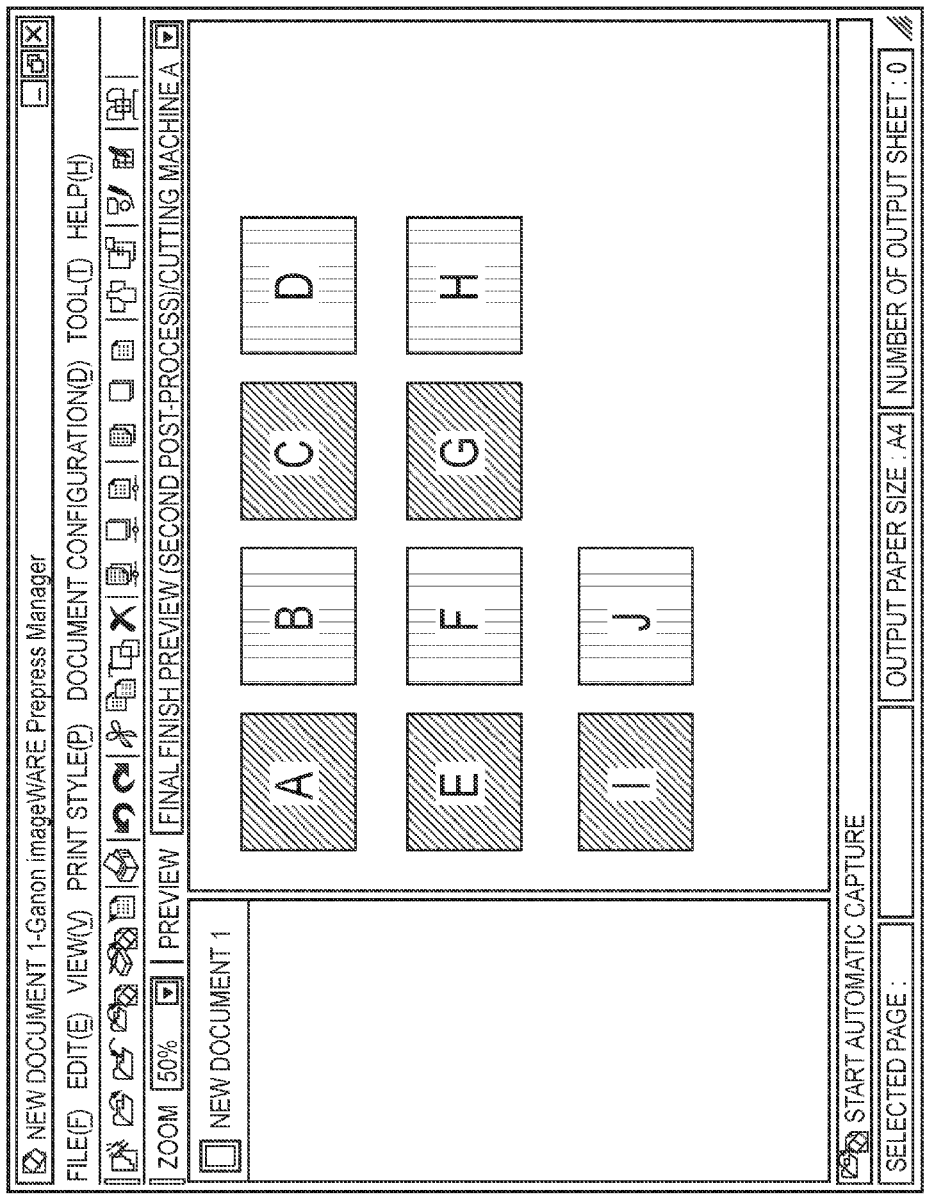
FIG. 25D is a view showing a preview display example.

"Final finish preview (X-th post-process)" is a preview mode which displays final products after all the post-processes. FIG. 25D shows a display example upon selection of "final finish preview (X-th post-process)". As can be seen from FIG. 25D, states of final products after trimming at positions of finished pages 1 are displayed.

Note that the bookbinding application 104 displays the name of the printer or finisher on the combo box 2501 so as to allow the user to confirm the printer or finisher used to obtain products, the states of which are displayed in each preview mode.

FIG. 25B displays the printer name selected on the "printer selection" window shown in FIG. 16 (printer C in this example) since it shows products by the printer.

FIG. 25C displays the near-line finisher name used in the first post-process (cutting machine B in this example) of those selected on FIG. 16 since it shows products after the first post-process using the near-line finisher. Note that the examples shown in FIGS. 25A to 25D correspond to those when the two near-line finishers are set. That is, since only one set of intermediate products are obtained, the combo box 2501 displays only one "intermediate finish preview (first post-process)/cutting machine B". However, when three or more near-line finishers are set, a plurality of items "intermediate finish preview (X-th post-process)/near-line finisher name" are displayed.

FIG. 25D shows products after the second post-process using the near-line finisher. For this reason, FIG. 25D displays the near-line finisher name used in the second post-process (cutting machine C in this example) of those selected on FIG. 16.

When two or more near-line finishers are set, the bookbinding application 104 makes preview displays that allow the user to confirms states of intermediate products and final products of the respective near-line finishers, thus preventing setting errors of the user. Also, the user can simultaneously confirm the name of the near-line finisher used to generate products and the order of the post-process executed to obtain that result on the single UI window 1100 together with the states of the products. In this manner, the user can be prevented from mistaking an order of post-processes using the near-line finishers.

Note that the sequences shown in FIGS. 21 to 23 are executed when "sheet preview (before post-process)/printer name" is selected. In order to display a preview of a designated post-process stage, the determination process in step S2208 of FIG. 22 is changed to determine "does finished size to be previewed still remain?". The "finished size to be previewed" is that associated with the selected post-process. For example, upon selection of "sheet preview", the "finished size to be previewed" corresponds to all set finished sizes. On the other hand, for example, upon selection of "final finish preview", the "finished size to be previewed" corresponds to only a set smallest finished size. In this way, a preview of the selected post-process after rendering of generated and stored layout data can be displayed in FIG. 23.

<Output Count Control of Cover Data>

When "case binding" is set as a finishing type, bookbinding application 104 requires only one finished page of a glued-on cover. For this reason, the bookbinding application 104 renders the same original document page data (for a glued-on cover) on finished pages laid out on a glued-on cover physical page. On the other hand, the bookbinding application 104 sequentially renders different original document page data included in the book file on finished pages laid out on a body text physical page. For this reason, when the user designates a plurality of copies as the number of copies upon printing the book file, covers as many as the number of copies N times of body text are generated due to the "glued-on cover imposition type" setting (in this case, the number of pages to be imposed=N). Hence, covers beyond the necessity are obtained depending on the number of copies designated at the time of printing. Hence, when "vertical 1×horizontal 2" or "vertical 2×horizontal 1" or more is set as "imposition type" of a glued-on cover, the bookbinding application 104 controls not to excessively output glued-on covers. At this time, an output count X of a glued-on cover is decided by:

Output count $X$ of glued-on cover=the number $M$ of copies÷the number of pages to be imposed (rounding decimal fractions)

In this manner, when the user designates a plurality of copes as the number of copies at the time of printing, coverts beyond the necessity can be prevented from being generated. For example, when "vertical 2×horizontal 1" is set as a cover imposition type, and printing of four copies is designated as a book of case binding, if four copies are applied to a cover, eight coverts are unwantedly generated. For this reason, by applying to the above equation, two covers of "vertical 2×horizontal 1" can be generated, and four covers can be obtained after trimming.

As described above, when products are generated by combining the printer and the plurality of near-line finishers, the bookbinding application 104 allows an operator to easily set finishing instructions to the near-line finishers and layout imposition instructions required to execute post-processes step by step using the plurality of finishers while observing preview windows. Then, the bookbinding application 104 generates a job ticket as an instruction to the printer and those as instructions to the near-line finishers based on the set information, and can simultaneously issue these instructions to the printer and all the near-line finishers. In this manner, the operator can easily make imposition operations on output sheets and issue instructions to the printer and near-line finishers at the same time on one application. For this reason, loads on the operator in pre-press and press operations can be reduced.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-195498, filed Sep. 5, 2012, which is hereby incorporated by reference herein in its entirety.

What is claimed is:

1. An information processing apparatus, comprising:
a storage which stores document data comprising a plurality of pages;
a processor, configured to
display a designation window for receiving a designation of nesting imposition which nests a page of a first finished size in a page of a second finished size larger than the first finished size;
receive the designation of nesting imposition via the designation window;
perform the nesting imposition to create imposition data using the plurality of pages so that, in the imposition data, a plurality of laid-out pages each of which has the first finished size is included in an imposed page of the second finished size, wherein the laid-out page is imposed so as to include an offcut region;
generate print data using the imposition data created by the nesting imposition; and
transmit the generated print data to a printer,
wherein printed material printed based on the print data is cut based on the second finished size, and then cut based on the first finished size.

2. The apparatus according to claim 1, wherein the processor is further configured to:
   determine the first finished size, the second finished size and the offcut width.

3. An information processing method using a processor and a storage which stores document data comprising a plurality of pages, comprising:
   displaying a designation window for receiving a designation of nesting imposition which nests a page of a first finished size in a page of a second finished size larger than the first finished size;
   receiving the designation of nesting imposition via the designation window;
   performing the nesting imposition to create imposition data using the plurality of pages so that, in the imposition data, a plurality of laid-out pages each of which has the first finished size is included in an imposed page of the second finished size, wherein the laid-out page is imposed so as to include an offcut region;
   generating print data using the imposition data created by the nesting imposition; and
   transmitting the generated print data to a printer,
   wherein printed material printed based on the print data is cut based on the second finished size, and then cut based on the first finished size.

4. The method according to claim 3, further comprising:
   determining the first finished size, the second finished size and the offcut width.

5. A non-transitory computer-readable storage medium on which is stored a computer-readable program which when implemented causes a computer to execute an information processing method using a storage storing document data comprising a plurality of pages, the method comprising:
   displaying a designation window for receiving a designation of nesting imposition which nests a page of a first finished size in a page of a second finished size larger than the first finished size;
   receiving the designation of nesting imposition via the designation window;
   performing the nesting imposition to create imposition data using the plurality of pages so that, in the imposition data, a plurality of laid-out pages each of which has the first finished size is included in an imposed page of the second finished size, wherein the laid-out page is imposed so as to include an offcut region;
   generating print data using the imposition data created by the nesting imposition; and
   transmitting the generated print data to a printer,
   wherein printed material printed based on the print data is cut based on the second finished size, and then cut based on the first finished size.

6. The non-transitory computer-readable storage medium according to claim 5, wherein the method further comprises:
   determining the first finished size, the second finished size and the offcut width.

* * * * *